(12) United States Patent
Moon

(10) Patent No.: US 12,014,034 B2
(45) Date of Patent: Jun. 18, 2024

(54) CONTENT PROCESSING METHOD

(71) Applicant: OMNIS LABS COMPANY, Seoul (KR)

(72) Inventor: Gwi Hwan Moon, Seoul (KR)

(73) Assignee: OMNIS LABS COMPANY, Seoul (KR)

( * ) Notice: Subject to any disclaimer, the term of this patent is extended or adjusted under 35 U.S.C. 154(b) by 47 days.

(21) Appl. No.: 17/753,217

(22) PCT Filed: Sep. 11, 2020

(86) PCT No.: PCT/KR2020/012275
§ 371 (c)(1),
(2) Date: Feb. 24, 2022

(87) PCT Pub. No.: WO2021/080175
PCT Pub. Date: Apr. 29, 2021

(65) Prior Publication Data
US 2022/0283696 A1  Sep. 8, 2022

(30) Foreign Application Priority Data
Oct. 21, 2019  (KR) ........................ 10-2019-0130549

(51) Int. Cl.
G06F 17/00  (2019.01)
G06F 3/04842  (2022.01)
G06N 20/00  (2019.01)

(52) U.S. Cl.
CPC ......... *G06F 3/04842* (2013.01); *G06N 20/00* (2019.01)

(58) Field of Classification Search
CPC ... G06F 3/04842; G06F 3/0482; G06N 20/00; G06N 3/105; H04N 21/854
(Continued)

(56) References Cited

U.S. PATENT DOCUMENTS

2011/0106723 A1*  5/2011  Chipley ............... G06Q 10/067
                                                      705/348
2016/0004583 A1*  1/2016  Sakaki ................. G06F 11/079
                                                      714/33
(Continued)

FOREIGN PATENT DOCUMENTS

JP   2014-203228 A   10/2014
KR   10-2006-0015028 A   2/2006
(Continued)

OTHER PUBLICATIONS

Chitiveli, Srinivas, image segmentation using IBM PowerAI Vision, YouTube Mar. 15, 2019, URL: https://youtube.com/watch?v=rFSg0gz3VJc (Year: 2019).*

(Continued)

*Primary Examiner* — Stephen S Hong
*Assistant Examiner* — Matthew J Ludwig
(74) *Attorney, Agent, or Firm* — Mark T. Vogelbacker; Eckert Seamans Cherin & Mellott, LLC

(57) ABSTRACT

A computer program stored in a computer-readable storage medium includes executing operations for providing a content processing method when executed on one or more processors in a computing device The operations can include an operation of displaying a first screen including a project-involved object for receiving a selection input for a project, and an operation of displaying a second screen for displaying a project execution step corresponding to the selected project. The second screen may include a navigation area including a step selection object for receiving a selection input for the project execution step and a project execution area for content processing corresponding to the project execution step.

14 Claims, 10 Drawing Sheets

(58) Field of Classification Search
USPC .......................................... 715/762; 706/15
See application file for complete search history.

(56) References Cited

U.S. PATENT DOCUMENTS

2016/0162478 A1*  6/2016  Blassin .......... G06Q 10/063112
                                                    706/12
2021/0081837 A1*  3/2021  Polleri .................... G06F 9/541

FOREIGN PATENT DOCUMENTS

| KR | 10-2014-0114983 A | 9/2014 |
| KR | 20160012537 A | 2/2016 |
| KR | 10-2019-0090290 A | 8/2019 |
| KR | 10-2111002 B1 | 5/2020 |

OTHER PUBLICATIONS

Ananthakrishnan, How to run Deep Learning models on Google Cloud Platform in 6 Steps?, Published in Google Cloud Community, 2018 (Year: 2018).*
International Search Report for PCT/KR2020/012275, dated Aug. 12, 2020.
International Written Opinion for PCT/KR2020/012275, dated Aug. 12, 2020.

* cited by examiner (a)

(b)

CONTENT PROCESSING METHOD

CROSS-REFERENCE TO RELATED APPLICATION

This application is a U.S. National Phase Application of International Application Number PCT/KR2020/012275, filed Sep. 11, 2020, which claims priority to and the benefit of Korean Patent Application No. 10-2019-0130549, filed on Oct. 21, 2019, the disclosures of which are incorporated herein by reference in their entirety.

TECHNICAL FIELD

The present disclosure relates to a content processing method, and more particular method of providing a user interface for processing content.

BACKGROUND ART

Deep learning includes a set of machine learning algorithms that attempt high-level abstraction through a combination of various non-linear variation techniques.

A variety of research is being conducted on machine learning algorithms and thus various deep-learning techniques such as deep neural network, convolutional neural network, and recurrent neural network have been applied in the fields of computer vision, voice recognition, natural language processing, etc.

Such a machine learning algorithm has a complex structure and may output a result through complex operations. In order to process data using a machine learning algorithm, profound understanding of the machine learning algorithm should be performed in advance and thus users who are able to use the machine learning algorithm may be limited.

Thus, in the art, there is a need to allow users to easily access machine learning algorithms.

Korean Patent Laid-Open Publication No. 2016-0012537 discloses a neural network training method and apparatus, and a data processing device.

DISCLOSURE

Technical Problem

The present disclosure is directed to providing a content processing method in relation to the background art described above.

Technical Solution

According to an embodiment of the present disclosure, there is provided a computer program stored in a computer-readable storage medium and causing operations of providing the computer program to be performed when executed by one or more processors of a computing device, wherein the computer program includes displaying a first screen including a project-involved object for receiving a selection input to select a project, and displaying a second screen displaying a project execution operation corresponding to the selected project, wherein the second screen includes a navigation area including an operation selection object for receiving a selection input for the project execution operation and a project execution area for processing content corresponding to the project execution operation.

In an alternative embodiment of operations of the computer program causing operations of providing a content processing method, a project selection layer of the first screen may include a project selection object for receiving a selection input for execution of a previously created project and a project creation object for receiving a selection input for creation of a new project.

In an alternative embodiment of operations of the computer program causing operations of providing a content processing method, a project creation layer of the first screen may include two or more project-involved objects for creating a project in response to a selection input for a project creation object included in a project selection layer, and the project-involved objects may be objects for receiving a selection input for setting items for the project.

In an alternative embodiment of operations of the computer program causing operations of providing a content processing method, the two or more project-involved objects may include a domain selection object for configuring a domain of content, a processing method selection object for setting a content processing method, and a model selection object for configuring a content processing algorithm.

In an alternative embodiment of operations of the computer program causing operations of providing a content processing method, the operation selection object may include a training operation selection object for receiving a selection input for a training operation and a content processing operation selection object for receiving a selection input for a content processing operation.

In an alternative embodiment of operations of the computer program causing operations of providing a content processing method, the project execution area may include a pre-processing layer for displaying a pre-processing operation for learning a project, and the pre-processing layer may include at least one of a pre-processing configuration area for displaying an object related to a pre-processing configuration, a pre-processing content area for displaying a list of content to be pre-processed, or a pre-processing operation area for performing a pre-processing operation.

In an alternative embodiment of operations of the computer program causing operations of providing a content processing method, the pre-processing content area may include two or more pre-processing target content objects corresponding to one piece of content to be pre-processed, and the computer program may further include loading content to be pre-processed, corresponds to one pre-processing target content object, in the pre-processing operation area in response to a selection input for the one pre-processing target content.

In an alternative embodiment of operations of the computer program causing operations of providing a content processing method, the pre-processing operation area may include an area for controlling pre-processing of content to be pre-processed on the basis of at least one of a pre-trained model or a user input.

In an alternative embodiment of operations of the computer program causing operations of providing a content processing method, the pre-processing operation area may include at least one of a pre-processing operation interface for a preview of content to be modified when a content processing method is a method of modifying content, a pre-processing operation interface tor assigning a classification label when the content processing method is a method of classifying content, a pre-processing operation interface for assigning an object identification label when the content processing method is a method of detecting an object of content, or a pre-processing operation interface for assigning a segmentation label when the content processing method is a method of segmenting content.

In an alternative embodiment of operations of the computer program causing operations of providing a content processing method, the project execution area may include a training layer for displaying a project learning operation, and the training layer may include at least one of a training setting area for receiving a selection input for training settings or a training operation area for displaying a training operation.

In an alternative embodiment of operations of the computer program causing operations of providing a content processing method, the training setting object may include at least one of a training setting object for receiving a user input for training settings or an object for displaying training progress information.

In an alternative embodiment of operations of the computer program causing operations of providing a content processing method, the training operation area may be an area for displaying information about a degree of completion of training.

In an alternative embodiment of operations of the computer program causing operations of providing a content processing method, the project execution area may include a processing target determination layer for receiving content to be processed using a learned project.

In an alternative embodiment of operations of the computer program causing operations of providing a content processing method, the project execution area may include a content processing layer for displaying a result for processing content to be processed, the project execution area may include a content processing layer for displaying a result for processing content to be processed, and the content processing layer may include at least one of an interface for displaying modified content when a content processing method is a method of modifying content, an interface for displaying content corresponding to a label for a selection input from a user among a plurality of labels when the content processing method is a method of classifying content or detecting an object, or an interface for displaying only an object obtained by segmenting content then the content processing method is a method of segmenting content.

According to an embodiment of the present disclosure, a content processing method includes displaying a first screen including a project-involved object for receiving a selection input to select a project, and displaying a second screen displaying a project execution operation corresponding to the selected project, wherein the second screen may include a navigation area including an operation selection object for receiving a selection input for the project execution operation and a project execution area for processing content corresponding to the project execution operation.

According to an embodiment of the present disclosure, a server for providing a content processing method includes a processor including one or more cores, and a memory, wherein the processor is configured to display a first screen including a project-involved object for receiving a selection input to select a project, and display a second screen displaying a project execution operation corresponding to the selected project, and the second screen may include a navigation area including an operation selection object for receiving a selection input for the project execution operation and a project execution area for processing content corresponding to the project execution operation.

Advantageous Effects

The present disclosure provides a content processing method.

MODES OF THE INVENTION

Figure 1:
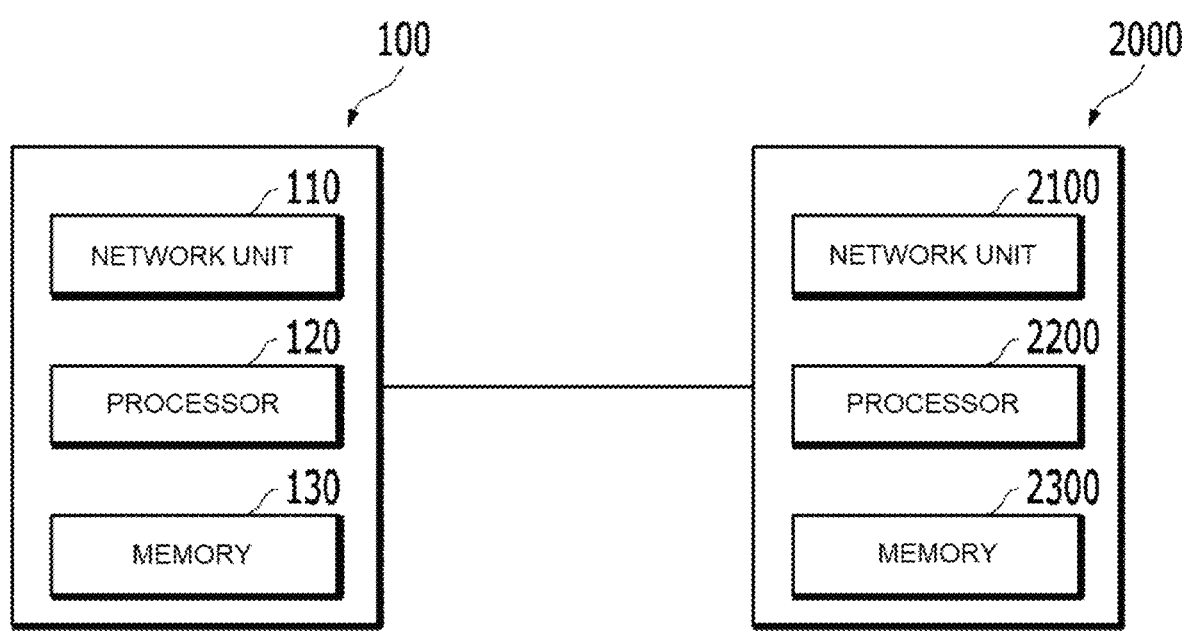
FIG. 1 is a block diagram of a computing device for performing operations of providing a content processing method according to an embodiment of the present disclosure.

Various embodiments will be described with reference to the drawings below. In the present specification, various descriptions are provided to assist in understanding of the present disclosure. However, it will be understood that these embodiments are executable without the descriptions.

The terms "component," "module," "system," etc. as used herein refer to computer-related entities, hardware, firmware, software, a combination of software and hardware, or execution of software. For example, a component may be, but is not limited to, a procedure executed by a processor, a processor, an object, a thread of execution, a program, and/or a computer. For example, both an application executed by a computing device and the computing device may be understood as components. One or more components may be included in a processor and/or a thread of execution. One component may be localized in a computer. One component may be distributed between two or more computers. In addition, such components may be executed from various types of computer-readable media in which various data structures are stored. The components may communicate with one another through local and/or remote processing, for example, according to a signal with one or more data packets (e.g., data transmitted to a system through a network such as the Internet according to data and/or a signal from one component interacting with another component in a local system or a distributed system).

The term "or" should be understood to mean "comprehensively" rather than "exclusively." That is, unless specified otherwise or specified clearly according to context, "X uses A or B" should be understood to mean one of natural intrinsic substitutions. That is, "X uses A or B" should be understood to mean that X uses A, X uses B, or X uses both A and B. The term "and/or" as used herein should be understood to indicate and include all possible combinations of one or more items among listed associated items.

The terms "comprise" and/or "comprising" should be understood to mean that characteristics and/or components are provided. However, the terms "comprise" and/or "comprising" should be understood to mean that one or more other features, components, and/or the presence or addition of a group thereof is not excluded. Unless specified otherwise or unless the context clearly indicates a singular form, a single component described in the present specification and the claims should be understood to mean one or more components.

In addition, it will be understood by those of ordinary skill in the art that various logical blocks, configurations, modules, circuits, means, logics, and operations of an algorithm described in relation to embodiments set forth herein may be implemented by electronic hardware, computer software, or combinations thereof. To clearly indicate the interchangeability of hardware and software, various components, blocks, configurations, means, logics, modules, circuits, and operations are generally described above in terms of functions thereof. Whether such functions are implemented by hardware or software depends on a specific application and design restrictions given to an overall system. Experienced technicians will be able to implement functions described herein in various ways for each specific application. However, the decisions of such implementations should not be construed as not falling within the scope of the present disclosure.

A description of the embodiments set forth herein is provided to allow those of ordinary skill in the technical field to which the present disclosure pertains to use or implement the present disclosure. Various modifications to these embodiments will be apparent to those of ordinary skill in the technical field to which the present disclosure pertains. General principles defined herein are applicable to other embodiments without departing from the scope of the present disclosure. Therefore, the present disclosure is not limited to the embodiments set forth herein. The present disclosure should be understood in a widest range consistent with the principles and novel features presented herein.

In an embodiment of the present disclosure, a server may include components for executing a server environment of the server. The server may include all devices in any form. The server limy be a digital device equipped with a processor and a memory and having arithmetic operation capability, such as a laptop computer, a notebook computer, a desktop computer, a web pad, or a mobile phone. The server may be a web server that processes services. The above-described examples of the server are only examples, and the present disclosure is not limited thereto.

"Neural network," "artificial neural network," and "network function" be used herein interchangeably in some cases.

FIG. 1 is a block diagram of a computing device for performing an operation of providing a content processing method according to an embodiment of the present disclosure.

A method of processing content by a processor 120 according to an embodiment of the present disclosure will be described below.

The content may be digitally created information. The content may include any form of information created digitally. The content may include, for example, information in the form of an image or text. The content may be, for example, a set of images or a set of text. The set of text may include, for example, an online document, a Word file, an Excel file, etc. The specific examples of the content described above are only examples and the present disclosure is not limited thereto.

Figure 2:
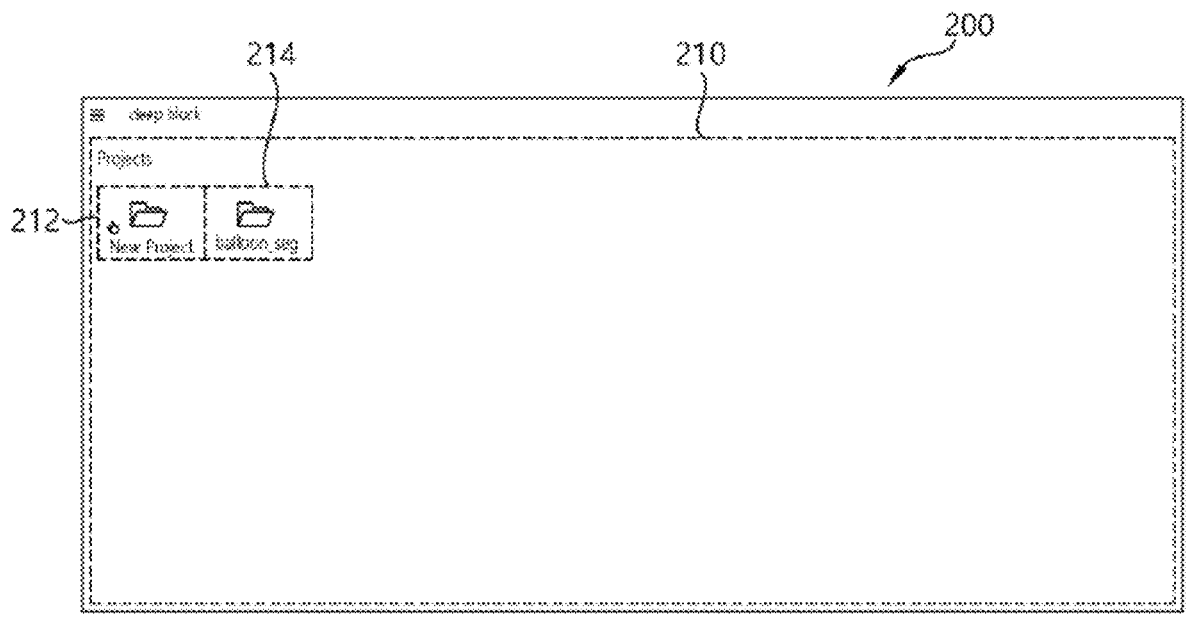
FIG. 2 is a diagram illustrating a project selection layer of a first screen according to an embodiment of the present disclosure.

A method of selecting a project by the processor 120 according to an embodiment of the present disclosure will be described with reference to FIG. 2 below. FIG. 2 is a diagram illustrating a project selection layer of a first screen according to an embodiment of the present disclosure.

To process content, the processor 120 may display a first screen 200 including a project-involved object for receiving a selection input for a project.

The project may be a set of series of tasks to be performed to process content. The project may match a configuration related to processing of the content. Two or more projects may be stored in a memory 130. Each of the two or more projects may be stored in the memory 130 to match the configuration related to the processing of the content. The memory 130 may store a set of content to be processed using each of the two or more projects or a set of content processed using each of the two or more projects.

The project selection layer 210 of the first screen 200 may include a project selection object 214 for receiving a selection input for execution of a previously created project and a project creation object 212 for receiving a selection input for creation of a new project. Although FIG. 2 illustrates one project selection object 214, the project selection object 214 is only an example and the present disclosure is not limited thereto. When two or more projects are stored in the memory 130, two or more project selection objects 214 may be displayed on the project selection layer 210. The two or more project selection objects 214 stored in the memory 130 may correspond to at least one of a project selection object corresponding to a created project or a shared project selection object received from another user or a computing device.

The processor 120 may receive a user input for the project selection object 214 or the project creation object 212, which is included in the project selecting layer 210, using a user interface or a network unit 110.

Upon receiving a user input for the project selection object 214, the processor 120 may execute a project corresponding to the project selection object 214. The processor 120 may display on the user interface a series of processes to be executed to process content, the series of processes being stored in the memory 130 to match the project selection object 214. In the case of a learned project, the processor 120 may display on the user interface a processing target determination layer 800 for inputting content to be processed. According to an embodiment of the present disclosure, when a project selection object is displayed on a user interface, a user may directly use a project used previously by the user. Alternatively, the user may download and use a project used by other users. Even users who lack specialized knowledge of a deep learning algorithm may easily process content using the deep learning algorithm by downloading and using projects created by users who have specialized knowledge.

Figure 3:
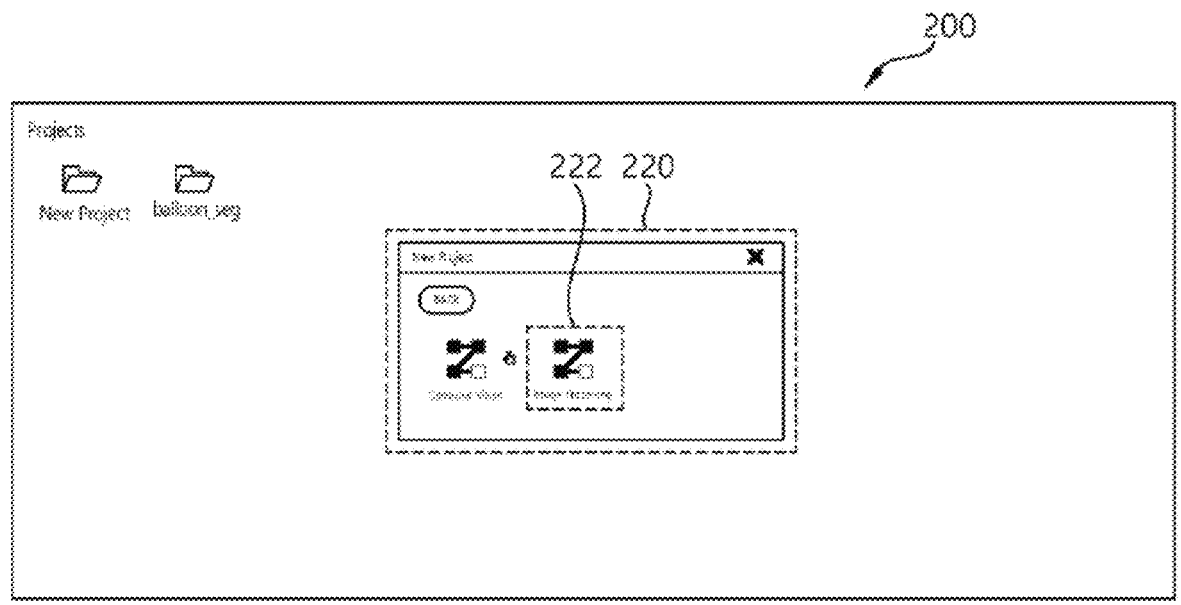
FIG. 3 is a diagram illustrating a project creation layer of a first screen according to an embodiment of the present disclosure.
Figure 4:
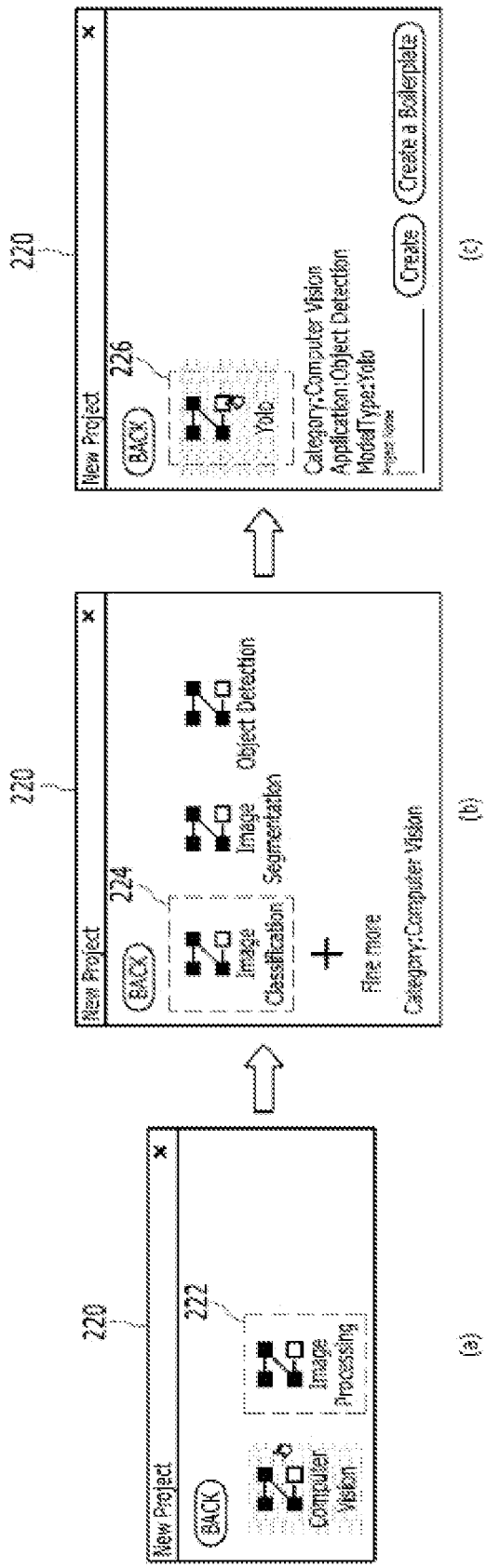
FIG. 4 is a diagram illustrating a project-involved object according to an embodiment of the present disclosure.

A method of creating a project by the processor 120 according to an embodiment of the present disclosure will be described with reference to FIGS. 3 and 4 below. FIGS. 3 and 4 are diagrams illustrating project creation layer of a first screen according to are embodiment of the present disclosure.

A first screen 200 may include a project selection layer 210 and a project creation layer 220. The project creation layer 220 may be a layer displayed according to a selection input from a user for the project creation object 212 included in the project selection layer 210. For example, the project selection layer 210 and the project creation layer 220 may be layers of different sizes. For example, the project creation layer 220 may be a layer higher than the project selection layer 210. For example, at least some areas of the project creation layer 220 may be displayed to be translucent and thus at least a portion of the project selection layer 210, which is a lower layer (i.e., a base layer), may be displayed on the user interface to be translucent. The project selection layer 210 and the project creation layer 220 described above are only examples and the present disclosure is not limited thereto.

The project creation layer 220 of the first screen 200 may include two or more project-involved objects for creating a project corresponding to a selection input for the project creation object 212 included in the project selection layer 210.

The project-involved objects may be objects for receiving a selection input for configuration items of the project. Each of the two or more project-involved objects may match a configuration related to the project. A configuration related to processing of content of a project may be determined on the basis of a selection input for the project-involved objects. The project-related configuration may include a configuration related to content to be processed in the project, e.g., a configuration related to the type of the content, a processing method, and the like.

The two or more project-involved objects may include a domain selection object 222 for configuring a domain of content, a processing method selection object 224 for setting a content processing method, and a model selection object 226 for configuring a content processing algorithm. The processor 120 may display a project-involved object step by step on the user interface to allow users to conveniently determine a configuration of the project.

The processor 120 may allow one or more domain selection objects 222 to be displayed on a user interface to create a project. The domain may be a set of content having the same format. For example, the domain may include an image domain, a text domain, a speech domain, etc. Each of the one or more domain selection objects 222 may match the domain. The one or more domain selection objects 222 may be, for example, an image domain selection object, a text domain selection object, a speech domain selection object, etc. Each of one or more domains may match one of one or more processing methods. That is, each of the one or more domain selection objects 222 may match one or more processing method selection objects 224. The specific examples of a domain selection object are only examples and the present disclosure is not limited thereto.

The processor 120 may display one or more processing method selection objects 224 on a user interface to create a project. The processor 120 may display on a user interface one or more processing method selection objects 224 matching a domain selection object 222 selected in response to a user input for the domain selection object 222. A processing method may be a method of processing content. The processing method may match a result to be obtained by processing content. Each of the one or more processing method selection objects 224 may be stored in the memory 130 to match the processing method. For example, when a user input for an image domain selection object is received, the processor 120 may display processing method selection objects 224 each corresponding to one of image classification, image segmentation, and object detection, which are processing methods matching an image domain, on the user interface. For example, when a user input for a text domain selection object is received, the processor 120 may display processing method selection objects 224 each corresponding to one of text mining and extraction of semantic information of text, which are processing methods matching a text domain, on the user interface. One or more processing methods may match one or more models. Each of the one or more processing method selection objects 224 may match one or more model selection objects 226. The specific examples of the processing method selection object described above are only examples and the present disclosure is not limited thereto.

The processor 120 may receive a new processing method through the network unit 110 or the user interface. When a new processing method is received, the processor 120 may receive an additional input for one or more models on which a processing method may be performed. The processor 120 may store the new processing method and the models in the memory 130.

The processor 120 may display one or more model selection objects 226 on the user interface to create a project. The processor 120 may display on the user interface one or more model selection objects 226 matching a processing method selection object 224 selected in response to a user input for the processing method selection object 224. A model may be an artificial neural network model for processing content. The model may include one or more network functions for processing content. For example, when a user input for a processing method selection object 224 for image segmentation is received, the processor 120 stay display one or more model selection objects 226 each corresponding to one of a fully convolutional network (FCN) model, a semantic segmentation network (SegNet) model, a U network (UNet) model, and a MaskRCNN model, which match the processing method selection object 224 for image segmentation, on the user interface. For example, when a user input for a processing method selection object 224 for image classification is received, the processor 120 may display one or more model selection objects 226 each corresponding to one of a DenseNet model, an InceptionV4 model, a NASNET model, a MobileNet model, etc., which match the processing method selection object 224 for image classification, on the user interface. For example, when a user input for a processing method selection object 224 for object detection is received, the processor 120 may display one or more model selection objects 226 each corresponding to one of a You Only Look Once (YOLO) model, a Region based Convolutional Neural Network (R-CNN) model, etc., which match the processing method selection object 224 for object detection, on the user interface. In a content processing method according to an embodiment of the present disclosure, even when models are not sufficiently understood, model names may be displayed on a user interface and a user may select a model, the specific structure of which has already determined, thereby increasing user convenience. The processor 120 may determine a model that has been used most frequently for each content processing method as a default model. The processor 120 may perform a content processing method using the default model when a user input is not received. The above description of a model selection object is provided only as an example and the present disclosure is not limited thereto.

The processor 120 may receive a new model through the network unit 110 or the user interface. The new model may be stored in the memory 130 to match a processing method. When a model is newly developed or a user wants to perform content processing using a new model, a content processing method according to an embodiment of the present disclosure may be performed by inputting the new model.

Figure 5:
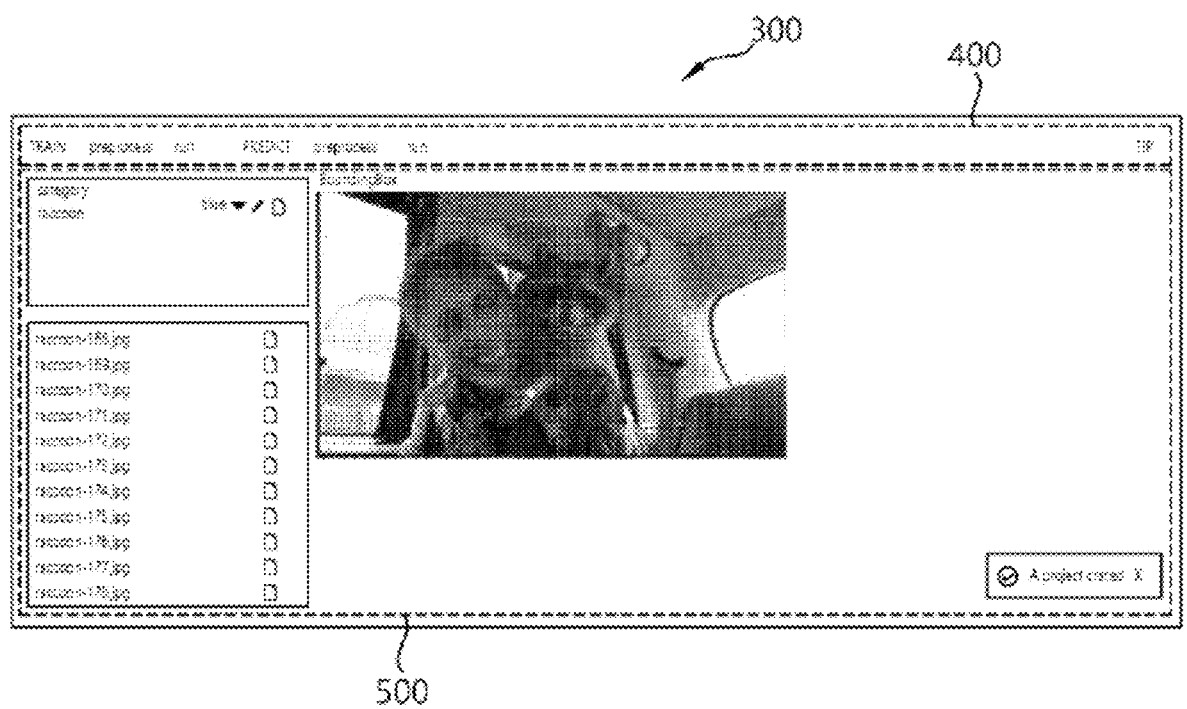
FIG. 5 is a diagram illustrating a second screen according to an embodiment of the present disclosure.

A method of displaying a project execution operation by the processor 120 according to an embodiment of the present disclosure will be described with reference to FIG. 5 below. FIG. 5 is a diagram illustrating a second screen according to an embodiment of the present disclosure.

The processor 120 may display a second screen 300 for displaying a project execution operation corresponding to a project selected in the first screen 200. The processor 120 may train a model included in a project in response to a selection input for the project creation object 212 included in the project creation layer 220 of the first screen 200, and display the second screen 300 for processing content using the model.

The second screen 300 may include a navigation area 400 including an operation selection object for receiving a selection input for a project execution operation, and a project execution area 500 for processing content corresponding to the project execution operation. The project execution area 500 may be an area in which a layer matching the project execution operation is displayed.

A pre-processing layer 600 of the project execution area 500 may be a layer for displaying a pre-processing operation for learning a project. A training layer 700 of the project execution area 500 may be a layer for displaying a project learning operation. The processing target determination layer 800 of the project execution area 500 may be a layer for receiving content to be processed using a learned project. A content processing layer 900 of the project execution area 500 may be a layer for displaying a result of processing the content. The pre-processing layer 600, the training layer 700, the processing target determination layer 800, and the content processing layer 900 may be layers of the same size. When one layer is displayed, three remaining layers may not be displayed on a user interface. The above description of these layers is provided only as an example and the present disclosure is not limited thereto.

Figure 6:
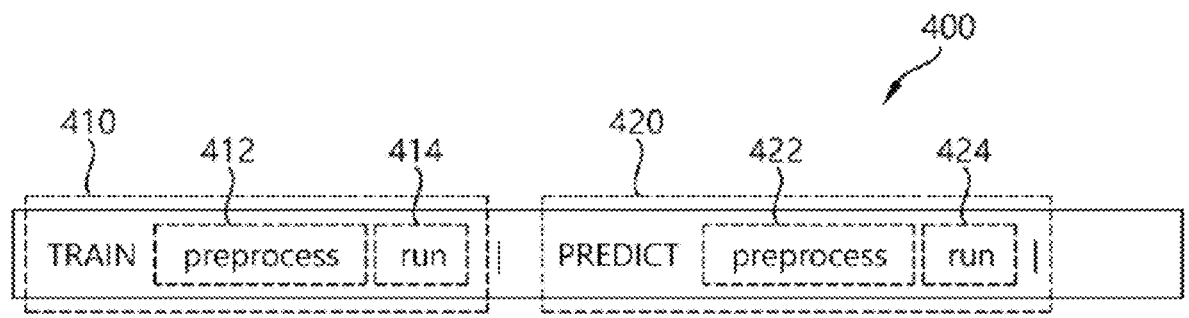
FIG. 6 is a diagram illustrating a navigation area according to an embodiment of the present disclosure.

A navigation area according to an embodiment of the present disclosure will be described with reference to FIG. 6 below. FIG. 6 is a diagram illustrating a navigation area according to an embodiment of the present disclosure.

A navigation area 400 may include an operation selection object for receiving a selection input for a project execution operation. The operation selection object include a training operation selection object 410 for receiving a selection input for a training operation, and a content processing operation selection object 420 for receiving a selection input for a content processing operation.

The project selection operation included in the navigation area 400 and a layer displayed on the project execution area 500 may match each other.

The training operation selection object 410 may correspond to an operation for training a model included in a project. The training operation selection object 410 may include a training pre-processing object 412 and a training object 414. The training pre-processing object 412 may correspond to an operation for creating training data for training a model. The training object 414 may correspond to an operation of training a model. The training pre-processing object 412 may match the pre-processing layer 600 displayed in the project execution area 500, and the training object 414 may match the training layer 700 displayed in the project execution area 500.

The content processing operation selection object 420 may correspond to an operation of processing content using a trained model included in a project. The content processing operation selection object 420 may include a content pre-processing object 422 and a content processing object 424. The content pre-processing object 422 may correspond to an operation of determining content to be processed using a trained model. The content processing object 424 may correspond to an operation of processing content using a model. The content pre-processing object 422 may match the processing target determination layer 800 displayed in the project execution area 500, and the content processing object 424 may match the content processing layer 900 displayed in the project execution area 500.

The navigation area 400 may be displayed in an area higher than the project execution area 500. Therefore, even when a layer displayed in the project execution area 500 is changed, a user may be able to check the navigation area 400 and quickly move to another operation to be used using the navigation area 400. The user may be able to conveniently identify an operation corresponding to an operation currently being performed in the project execution area 500 among all operations by checking an object corresponding to a current operation displayed in the navigation area 400.

Figure 7:
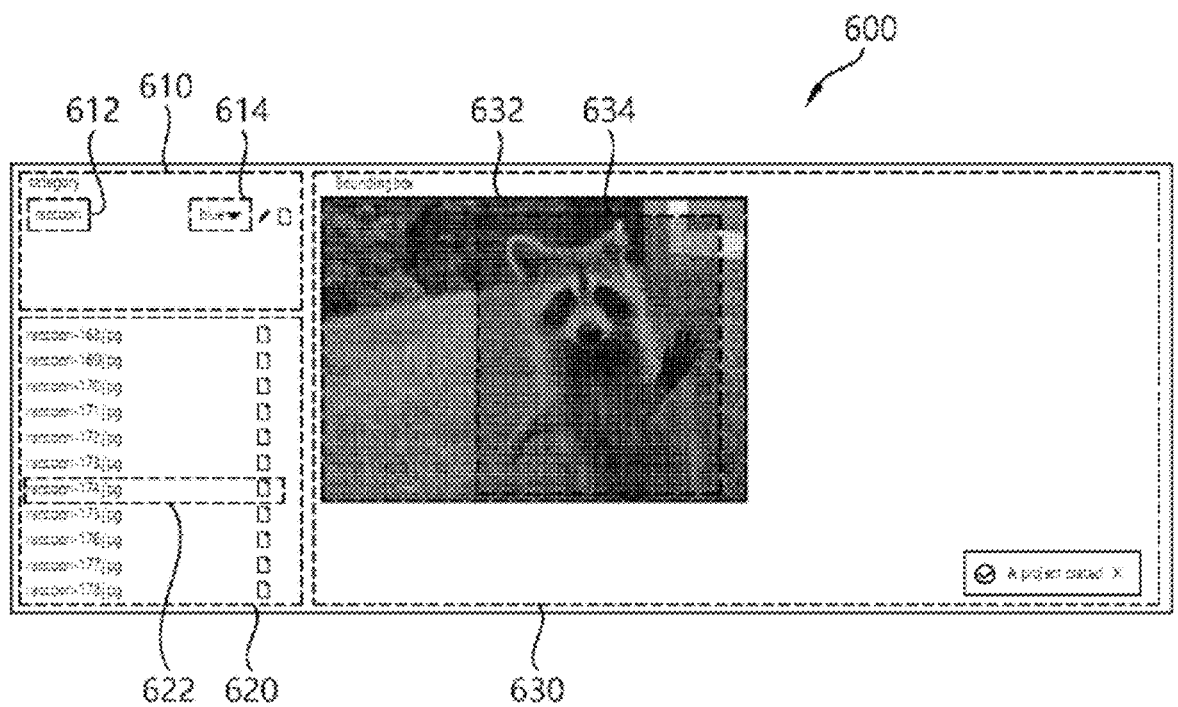
FIG. 7 is a diagram illustrating a pre-processing layer of a project execution area according to an embodiment of the present disclosure.
Figure 8:
FIG. 8 is a diagram illustrating a pre-processing layer of a project execution area according to an embodiment of the present disclosure.

A method of performing pre-processing by the processor 120 according to an embodiment of the present disclosure will be described with reference to FIGS. 7 and 8 below. FIGS. 7 and 8 are diagrams illustrating a pre-processing layer of a project execution area according to embodiments of the present disclosure.

The project execution area 500 may include a pre-processing layer 600 for displaying a pre-processing operation for learning a project. The pre-processing layer 600 may be a layer for displaying an operation of creating training data for learning a project.

The pre-processing layer 600 may include at least one of a pre-processing configuration area 610 for displaying an object related to a pre-processing configuration, a pre-processing content area 620 for displaying a list of content to be pre-processed, or a pre-processing operation area 630 for performing a pre-processing operation.

The pre-processing configuration area 610 may display configuration information related to pre-processing of content to be pre-processed. The pre-processing configuration area 610 may display configuration information for creating training data using content to be pre-processed. The object related to the pre-processing configuration may be an object displayed on a user interface to receive pre-processing-related configuration information. The object related to the pre-processing configuration may match a configuration of a label of training data and a configuration of pre-processing the training data.

The configuration of pre-processing the training data may be setting a method of pre-processing content to be pre-processed, the content being input data included in the training data. A configuration of a pre-processing operation may be associated with at least one of a domain of content or a processing method of the content. For example, when a domain of content is an image, based on the configuration of the pre-processing operation, the processor 120 may change the sizes of content to be pre-processed, which is to be input to a model, (for example, so that the content to be pre-processed, which is to be input to the model, may have the same size). For example, when a domain of content is text, based on the configuration of the pre-processing operation, the processor 120 may vectorize text to be input to a model, correct typographical errors or spacing in the text, or perform text classification according to a subject of an utterance. For example, when a domain of content is speech, based on the configuration of the pre-processing operation, the processor 120 may perform speech-to-text (STT) conversion on the text. For example, the processor 120 may perform an operation of excluding text input from users other than a certain user, when a content processing method is a method of identifying a topic of text and a topic of text from the user among a plurality of subjects who are inputting text according to the configuration of the pre-processing operation. The configuration of the pre-processing operation described above in detail is only an example and the present disclosure is not limited thereto.

The configuration of the label of the training data may be a configuration of a label matching content that is to be pre-processed and that is input data. The label of the training data may be associated with a content processing method.

When the content processing method is a method of classifying an image, the configuration of the label of the training data may be a configuration of a class for image classification. For example, the processor 120 may receive a class 612 for a raccoon, a human, a balloon, or the like through the network unit 110 or a user interface. Image classification may be classification of facial expressions included in an image. For example, the processor 120 may receive the class 612 for joy, sadness, anger, or the like through the network unit 110 or the user interface. The configuration of the label described above in detail is only an example and the present disclosure is not limited thereto.

When the content processing method is a method of detecting an object or segmenting an image, the configuration of the label of the training data may be a configuration of a form of the label and information 614 for identification of a label according to a class. The form of the label may be, for example, a form, e.g., a rectangular or circular form, a color, etc. of the label for displaying an object in the case of object detection. For example, a label 634 may be displayed in a rectangular form in a pre-processing operation area 630 on the basis of the configuration of the label. The form of the label may be, for example, a label form for displaying a position of an object to be detected, for example, in the case of image segmentation. For example, the processor 120 may set a label by creating a first point that is a boundary between an object and a background on the basis of a first input from a user, creating a second point that is a boundary between the object and the background on the basis of a second input from the user, and connecting the first and second points by a straight or curved line. The information 614 for identification of a label according to a class may be information for displaying labels corresponding to different classes differently. The information 614 for identification of the label according to a class may be information for distinguishing a label corresponding to one class from a label corresponding to another class. For example, the information 614 for identification of a label according to a class may include a color of the label, a shape of a line, etc. For example, when there are two classes corresponding to a raccoon and a balloon, a label for the raccoon may be set to be displayed in blue and a label for the balloon may be set to be displayed in yellow. The above description of the configuration of the label is provided only as an example and the present disclosure is not limited thereto.

A user may be able to conveniently set a pre-processing method using the pre-processing configuration area 610. In addition, the user may easily set a pre-processing method through selection inputs for objects included in the pre-processing configuration area 610.

According to an embodiment of the present disclosure, a model may be trained by at least one of the processor 120 of the computing device 100 or a processor 2200 of a server 2000. The processor 120 of the computing device 100 may receive data for training a model and a user input for training settings through the network unit 110. The processor 120 of the computing device 100 may train a model on the basis of the data and the user input for training settings. The processor 120 of the computing device 100 may transmit the data and the user input for training settings to the server 2000 through the network unit 110 to allow the server 2000 to train the model. For example, the server 2000 may be a cloud computing device.

According to an embodiment of the present disclosure, the processor 120 of the computing device 100 may receive a trained model from the server 2000 through the network unit 110. The processor 120 may receive information about a weight assigned to the trained model and store the information about the weight in the memory 130. The processor 120 may perform an operation on content to be processed, which is input data, using the trained model. Computing power and memory efficiency of the computing device 100 may be increased by receiving only training settings and input data by the computing device 100 of a user and training a model by the server 2000 which is a cloud computing device.

According to an embodiment of the present disclosure, the processor 120 of the computing device 100 may transmit content to be processed to the server 2000 through the network unit 110, so that the server 2000 may perform an operation using the trained model. The processor 120 of the computing device 100 may receive only a result of performing an operation on content to be processed from the server 2000 through the network unit 110. Computing power and memory efficiency of the computing device 100 may be increased by receiving only settings for training and inference and input data by the user's computing device 100 and training a model and performing an inference operation using the trained model by the server 2000, which is a cloud computing device. Because a cloud server is used to train the model and perform interference, limitations of a user's computing device in terms of arithmetic capability are overcome and thus large-scale models are capable of being trained and a service provider of the cloud server may create profit using the arithmetic capability of the cloud server. When the computing device 100 is a mobile device, complex operations may be difficult to perform and thus data may be transmitted to the server 2000 to process the data by the server 2000.

The pre-processing content area 620 may include two or more pre-processing target content objects 622 each corresponding to one piece of content to be pre-processed. The pre-processing target content object 622 may correspond to training data input for training a model. The processor 120 allows content to be pre-processed, which corresponds to one pre-processing target content object 622, to be loaded to the pre-processing operation area 630 in response to a selection input for the one pre-processing target content object 622. A user may pre-process desired content and easily manage content to be pre-processed by clicking content to be pre-processed, which is included in the pre-processing content area 620.

The pre-processing operation area 630 may be an area for controlling pre-processing of pre-processing target content 632 on the basis of at least one of a pre-trained model or a user input. The pre-processing operation area 630 may be an area for controlling pre-processing of content to be pre-processed on the basis of configuration information related to pre-processing. According to an embodiment of the present disclosure, the processor 120 may receive a user input related to a pre-processing operation from a user and pre-process the pre-processing target content 632. According to another embodiment of the present disclosure, the processor 120 may create a pseudo-pre-processing result (i.e., a pseudo-label) by pre-processing the pre-processing target content 632 on the basis of the configuration information related to pre-processing, display the pseudo-pre-processing result to a user, receive a user input from the user in response to the pseudo-pre-processing result, and create a pre-processing result (i.e., a label based on the pseudo-label). The user may input the label according to a predetermined method and the processor 120 may create training data according to the label input from the user, thereby increasing convenience in creating the training data. Alternatively, the processor 120 may provide the pseudo-label to the user and the user may simply input an evaluation as to whether the pseudo-label is correct or incorrect, and thus it may be efficient in terms of time and costs when a large amount of training data is created.

The processor 120 may display the pre-processing target content 632, which is at least partially pre-processed, on the pre-processing operation area 630 on the basis of a configuration of a preprocessing operation associated with a domain of the content. The processor 120 may allow the pre-processing target content 632, which is at least partially pre-processed, to be loaded to the pre-processing operation area 630 in response to a selection input for the pre-processing target content object 622. For example, when the domain of the content is an image, the processor 120 may change a size of the image to display the pre-processing target content 632 in the pre-processing operation area 630. When the domain of the content is text, the processor 120 may display content to be pre-processed in the pre-processing operation area 630 by correcting typographical errors or spacing in the text or classifying the text according to an utterance of the text or an upper-layer category. The above description of the displaying of the content to be pre-processed in the pre-processing operation area 630 is provided only as an example and the present disclosure is not limited thereto. By displaying content to be pre-processed, which is basically pre-processed, in a pre-processing operation area by the processor 120, it may be efficient in terms of time and costs needed for a user to pre-process the content.

A pre-processing operation according to a content processing method will be described.

A pre-processing operation when the content processing method is a method of modifying content will be described below. The pre-processing operation area 630 may include a pre-processing operation interface for inputting modified content when a content processing method is a method of modifying content.

According to an embodiment of the present disclosure, the pre-processing operation area 630 may be an area for receiving a user input for content modified according to modification criteria. The processor 120 may use modified content, which is uploaded by a user, as a label of training data in the pre-processing operation area 630. For example, when the content processing method corresponds to a purpose of a project for converting content to be processed into a Van Gogh style image, the pre-processing target content 632 may be input training data that is an object to be converted into the Van Gogh style image, a configuration of a pre-processing operation may be a configuration of converting content into the Van Gogh style image (e.g., a Van Gogh image, a description of Van Gogh's style, etc.), and a Van Gogh style image, which is obtained by the conversion and uploaded from a user, may be a label of the training data. The above description of the pre-processing operation is provided only as an example and the present disclosure is not limited thereto.

According to an embodiment of the present disclosure, when the content processing method is a method of converting content, the pre-processing operation area 630 may include a pre-processing operation interface for a preview of content to be converted. The preview of the content to be converted may be a pseudo-pre-processing result. The processor 120 may create the preview of the content to be converted by converting the pre-processing target content 632 using a conversion criterion. When the conversion criterion is an image style conversion, the processor 120 may create the preview of the pre-processing target content 632 in consideration of a line and a color of an image serving as conversion criterion. The processor 120 may convert a curvature, a thickness, etc. of a line of an image of the pre-processing target content 632 to be substantially the same as a curvature, a thickness, etc. of the line of the image serving as the conversion criterion, and convert a color (including chroma, brightness, etc.) of the image of the pre-processing target content 632 to be substantially the same as a color of the image serving as the conversion criterion. The processor 120 displays previews of one or more pieces of content to be converted in the pre-processing operation area 630 to receive a user input indicating whether they are correct or incorrect with respect to the previews. The processor 120 may determine a preview of content as a result of pre-processing the content (i.e., a label) on the basis of the user input indicating that it is correct. The processor 120 may change the preview of the content using correction information on the basis of the user input indicating that it is incorrect and including the correction information (i.e., a correct answer) or may determine the correction information as a pre-processing result. The processor 120 may create training data, for example, on the basis of an image of the preview indicated as correct by the user. That is, when a project is directed to changing a style, the processor 120 may create a preview of pseudo-style change target content and allow a user to determine whether the preview is appropriate or not and to select an appropriate preview, thereby generating a training result greatly reflecting the user's intention. The above description of the pre-processing operation area is provided only as an example and the present disclosure is not limited thereto.

A pre-processing operation when the content processing method is a method of classifying content will be described below. The pre-processing operation area 630 may include a pre-processing operation interface for assigning a classification label when a content processing method is a method of classifying content.

According to an embodiment of the present disclosure, the pre-processing operation area 630 may be an area for receiving a user input for the classification label of the content. The processor 120 may perform a pre-processing operation in the pre-processing operation area 630 using a class determined using the pre-processing configuration area 610. The processor 120 may receive a selection input, for a class to which the pre-processing target content 632 belongs among two or more classes for image classification, through a user interface or the network unit 110. The processor 120 may allow the pre-processing target content 632 and one or more classification labels to be displayed in the pre-processing operation area 630. The processor 120 may store a classification label (i.e., a correct answer), which is determined based on a user input among the one or more classification labels displayed in the pre-processing operation area 630, to match the pre-processing target content 632. For example, a user may input information as to whether content to be pre-processed includes an object corresponding to a classification label (e.g., when there is one classification class), a classification label of an object included in the content to be pre-processed, etc. (e.g., when there are a plurality of classification classes, a selection input for the type of the object included in the content among the plurality of classification classes, etc.) through a user interface displayed in the pre-processing operation area 630. For example, when an image includes a human face, each of a plurality of classes may correspond to one facial expression. For example, the plurality of classes may be classes such as joy, sadness, anger, etc., and content to be pre-processed may be classified as joy, sadness, and anger. According to an embodiment of the present disclosure, when a content processing method is a method of classifying facial expressions of a human face, the processor 120 may receive a classification label for facial expressions. According to an embodiment of the present disclosure, when a content processing method is a method of classifying facial expressions of a human face, the processor 120 may receive an additional label for components of the human face. For example, the components may be eyes, mouth, etc. based on which the facial expressions of the human face are classified but the present disclosure is not limited thereto. For the processor 120 may classify the facial expressions of the human face using the additional label for the components. The processor 120 may display content to be pre-processed in the pre-processing operation area 630 and display a component designation object in the pre-processing operation area 630 so that a user may designate a component included in a face image. The processor 120 may display the component designation in the pre-processing operation area 630 so that a user may provide a selection input for the component (e.g., eye) designation object and an eye region of the face image. The user may attach a label to a face component through a selection input for the component designation object and designate a region of the face component through a selection input for a region of the face image that includes a component. The user may create an additional label for a component of the face image through two selection inputs. The processor 120 may create labeled data that includes an image, a classification label for a facial expression input from a user, and an additional label for a component of a face image. The processor 120 may classify facial expressions using an additional label that is an input, for a component, received from a user. The processor 20 may classify facial expressions using the labeled data that includes the classification label and the additional label. When the input additional label for the component received from the user is used, the efficiency of classifying the user's facial expressions may be greatly increased. In addition, the user is able to create labeled data for learning classification of facial expressions by clicking only several times, thereby increasing convenience. The above description of the pre-processing operation area 630 is provided only as an example and the present disclosure limited thereto. When an operation is performed in a pre-processing operation area according to an embodiment of the present disclosure, a user may assign a classification label to content by simply performing a selection input for one of a plurality of displayed classes without having to individually input each class of the classification label, thereby increasing user convenience in creating training data.

According to an embodiment of the present disclosure, the pre-processing operation area 630 may be an area for receiving a user input for a pseudo-classification label for content. When a user input for a classification label of some pre-processing target content 632 among two or more pieces of pre-processing target content 632 displayed in the pre-processing content area 620 is received, the processor 120 may train a model using the some pre-processing target content 632 and create a pseudo-classification label of the other pre-processing target content 632 using the trained model. The processor 120 may allow the other pre-processing target content 632 and the pseudo-classification label corresponding thereto to be displayed in the pre-processing operation area 630. The processor 120 may receive a user input indicating whether the pseudo-classification label is correct or incorrect. The processor 120 may determine the pseudo-classification label as a classification label matching the pre-processing target content 632 on the basis of the user input indicating that it is correct or determine a classification label matching the processing target content 632 on the basis of the user input indicating that it is incorrect and including correction information (i.e., a correct classification label) from the user. The above description of the pre-processing operation area is provided only as an example and the present disclosure is not limited thereto.

A pre-processing operation when the content processing method is a method of detecting air object will be described below. The pre-processing operation area 630 may include a pre-processing operation interface for assigning an object identification label when a content processing method is a method of detecting an object.

According to an embodiment of the present disclosure, the pre-processing operation area 630 may be an area for receiving a user input for the object identification label. The processor 120 may receive an object identification label for the pre-processing target content 632 through a user interface or the network unit 110, based on a configuration of a label of training data determined using the pre-processing configuration area 610. The processor 120 may receive an input of an object identification label through a click and drag operation. The processor 120 may display a label to overlap the pre-processing target content 632 on the basis of the input of the object identification label and configuration of the label of the training data. For example, the processor 120 may display the label 634 of a rectangular shape in blue on an image of a raccoon, based on an input of an object identification label of a raccoon object, which is included in the pre-processing target content 632, from a user and a configuration of a label of training data. The processor 120 may store, as training data, the pre-processing target content 632 and the input of the object identification label from the user by snatching them each other. When a user displays an object by simply clicking and dragging it, the processor 120 may receive a user input and create training data, thereby increasing user convenience in creating the training data.

According to an embodiment of the present disclosure, the pre-processing operation area 630 may be an area fir receiving a user input for a pseudo-object identification label of content. When a user input for an object identification label of some pre-processing target content 632 among two or more pieces of pre-processing target content 632 displayed in the pre-processing content area 620 is received, the processor 120 may train a model using the some pre-processing target content 632 and output a pseudo-object identification label of the other pre-processing target content 632 using the trained model. The processor 120 may allow the other pre-processing target content 632 and the pseudo-object identification label corresponding thereto to be displayed in the pre-processing operation area 630. The processor 120 may receive a user input indicating whether the pseudo-object identification label is correct or incorrect. The processor 120 may determine the pseudo-object identification label as an object identification label matching the pre-processing target content 632 on the basis of the user input indicating that it is correct or determine an object identification label matching the pre-processing target content 632 on the basis of the user input indicating that it is incorrect and including correction information (i.e., a correct object identification label) from the user. In addition, the user may generate a modified label by modifying a size or form of the displayed pseudo-label. The above description of the pre-processing operation area is provided only as an example and the present disclosure is not limited thereto.

A pre-processing operation when the content processing method is a method of segmenting content will be described below. The pre-processing operation area 630 may include a pre-processing operation interface for assigning a segmentation label when a content processing method is a method of segmenting content.

According to an embodiment of the present disclosure, the pre-processing operation area 630 may be an area for receiving a user input for a segmentation label 634. The processor 120 may receive the segmentation label 634 for the pre-processing content 632 through a user interface or the network unit 110, based on a configuration of a label of training data determined using the pre-processing configuration area 610. The processor 120 may create the segmentation label 634 by connecting two or more user inputs. The processor 120 may create the segmentation label 634 by connecting two or more user inputs corresponding to a boundary between an object and a background that are included in the pre-processing target content 632. The processor 120 may generate a first point on the basis of a first user input for displaying the boundary between the object and the background, generate a second point on the basis of a second user input, and create the segmentation label 634 by generating a line connecting the first and second points. That is, a user may create a segmentation label simply by performing clicking and dragging along a boundary of the object or clicking a contour while following the boundary. The above description of the pre-processing operation area is provided only as an example and the present disclosure is not limited thereto. The user may create the segmentation label by transmitting only some inputs to the processor 120 to display the boundary between the object and the background, thereby increasing user convenience in creating training data.

According to an embodiment of the present disclosure, the pre-processing operation area 630 may be an area for receiving a user input for a pseudo-segmentation label for content. The processor 120 may create a pseudo-segmentation label using an image processing algorithm. The image processing algorithm may include Canny edge detection, Harris corner detection, etc. but the present disclosure is not limited thereto. The processor 120 may blur the pre-processing target content 632 through the Canny edge detection to remove noise, detect edges using a mask edge, remove non-maximum values, and extract the edges by connecting the edges by identifying sizes of the edges using a double threshold. An image processing algorithm technique may be used to extract an edge having a certain pixel thickness from the pre-processing target content 632. The processor 120 may determine as a pseudo-segmentation label the edge having a certain pixel thickness and extracted from the pre-processing target content 632. That is, a user may create the segmentation label in a simple manner by designating only an object and a non-object in content. The above description of the pseudo-segmentation label is provided only as an example and the present disclosure is not limited thereto.

Alternatively, when a user input for a segmentation label of some pre-processing target content 632 among two or more pieces of pre-processing target content 632 displayed in the pre-processing content area 620 is received, the processor 120 may train a model using the some pre-processing target content 632 and output a pseudo-segmentation label of the other pre-processing target content 632 using the trained model. The above description of the pseudo-segmentation label is provided only as an example and the present disclosure is not limited thereto.

The processor 120 may allow the pre-processing target content 632 and the pseudo-segmentation label corresponding thereto to be displayed in the pre-processing operation area 630. The processor 120 may receive a user input indicating whether the pseudo-segmentation label is correct or incorrect. The processor 120 may determine the pseudo-segmentation label as a segmentation label matching the pre-processing target content 632 on the basis of the user input indicating that it is correct or determine a segmentation label matching the processing target content 632 on the basis of the user input indicating that it is incorrect and including correction information (i.e., a correct segmentation label) from a user. The above description of the pre-processing operation sa is provided only as an example and the present disclosure is not limited thereto.

A pre-processing operation when a content processing method is a natural language processing method will be described below.

According to an embodiment if the present disclosure, the pre-processing operation 630 may be an area for receiving a user input for a semantic label of content. The semantic label may be a subject, a category or the like of content to be pre-processed. The processor 120 may display text included in the pre-processing target content 632 in the pre-processing operation area 630 and receive a semantic label, which is semantic information of the text, from a user. The processor 120 may display text included in the pre-processing target content 632 and two or more semantic labels in the pre-processing operation area 630, and receive a selection input for a semantic label. For example, when pre-processing target content includes the text "What should I do when I'm delivered damaged clothes?", the processor 120 may receive, from a user, a selection input for a semantic label "inquiry about exchange/return" from among semantic labels "inquiry about delivery" and "inquiry about exchange/return" displayed in the pre-processing operation area 630. The above description of the pre-processing operation area is provided only as an example and the present disclosure is not limited thereto.

Figure 9:
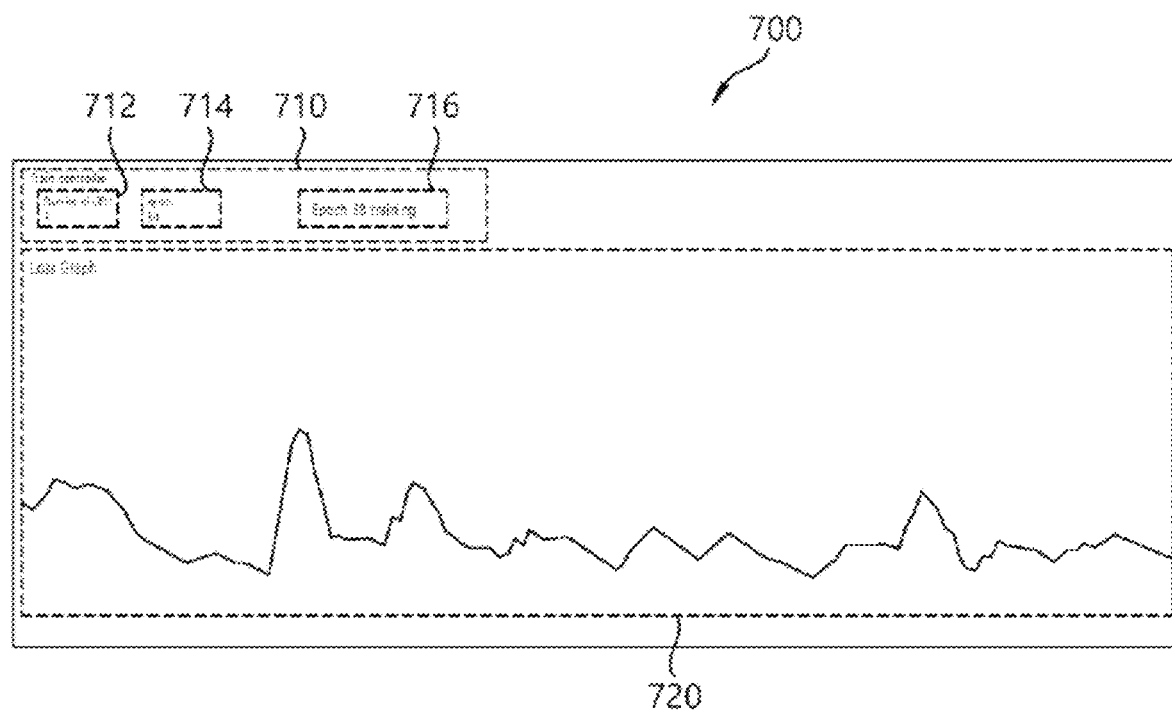
FIG. 9 is a diagram illustrating a training layer of a project execution area according to an embodiment of the present disclosure.

A method of performing training by the processor 120 according to an embodiment of the present disclosure will be described with reference to FIG. 9 below. FIG. 9 is a diagram illustrating a training layer of a project execution area according to an embodiment of the present disclosure.

The project execution area 500 may include a training layer 700 for displaying a project learning operation. The training layer 700 may include at least one of a training setting area 710 for receiving a selection input for training settings or a training operation area 720 for displaying a training operation.

The training setting area 710 may include at least one of training setting objects 712 and 714 for receiving a user input related to training settings or an object 716 for displaying training progress information.

The training setting objects 712 and 714 may be graphical objects for receiving a user input relating to training settings. For example, the training setting objects 712 and 714 are graphic objects for receiving a user input for a hyper-parameter related to learning, such as a training epoch, resource utilization (e.g., a GPU), a learning rate, etc. When a user input for training settings is received, the processor 120 may perform training on the basis of the user input. When a user input relating to training settings is not received, the processor 120 may perform training on the basis of training settings determined by the amount of training data, a domain of content, a content processing method, a content processing algorithm, etc. For example, the processor 120 may receive a user input relating to training settings, including 1 GPU, 50 epoch, an initial learning rate of 70, and a late learning rate of 30. The above description of the training settings is provided only as an example and the present disclosure is not limited thereto. Training settings may be established by users, thereby contributing to research on content processing methods. An output and a level of completion of learning that vary according to training settings may be checked by users, thereby contributing to research on users' deep learning.

The object 716 for displaying training progress information may include a degree of completion of total training settings. For example, the training progress information may include a rate of completion of training according to a performed training epoch among set total training epochs. For example, when the initial learning rate and the late learning rate are set differently, the training progress information may be information as to whether initial learning and/or lateral learning was performed. For example, the training progress information may be displayed numerically or in a diagram form in the training setting area 710. The above description of the training progress information is provided only as an example and the present disclosure is not limited thereto.

The training operation area 720 may be an area for displaying information about a degree of completion of training. The information about the degree of completion of training may be displayed numerically, in a diagram or by a visualization method that helps users easily recognize it. The processor 120 may display the information about the degree of completion of training, which changes as training is performed using the training data, in the training operation area 720.

To train a model corresponding to a content processing algorithm, the processor 120 may input content to be processed, which is included in the training data, to one or more input nodes included in an input layer of the model and compare a result of performing an operation at an output layer of the model (i.e., an output) with a label (i.e., correct answer) included in the training data to calculate a loss. The processor 120 may adjust a weight of the model on the basis of the loss. The processor 120 may update a weight set for each link by transmitting the adjusted weight to the input layer from an output layer included in one or more network functions of the model through one or more hidden layers, based on the loss.

The processor 120 may display, for example, information about a degree of completion of training, including a number of times training is performed and a loss according to training, in the training operation area 720. The processor 120 may display the information about the degree of completion of training, which changes as training is performed, in the training operation area 720. The processor 120 may display the information about the degree of completion of training, including training iterations and/or the loss according to training epoch, in the training operation area 720. For example, the processor 120 may display the information about the degree of completion of training by displaying the number of times training is performed on an x-axis of a graph and displaying a loss on a y-axis of the graph. The processor 120 may display the information about the degree of completion of training in the training operation area 720 by updating the graph whenever a training iteration and/or training epoch is performed. When a user input for a point on the graph is received, the processor 120 may display a number of times training is performed and a loss according to training, which correspond to the point, in a pop-up form. The above description of the training operation area 720 is provided only as an example and the present disclosure is not limited thereto.

Figure 10:
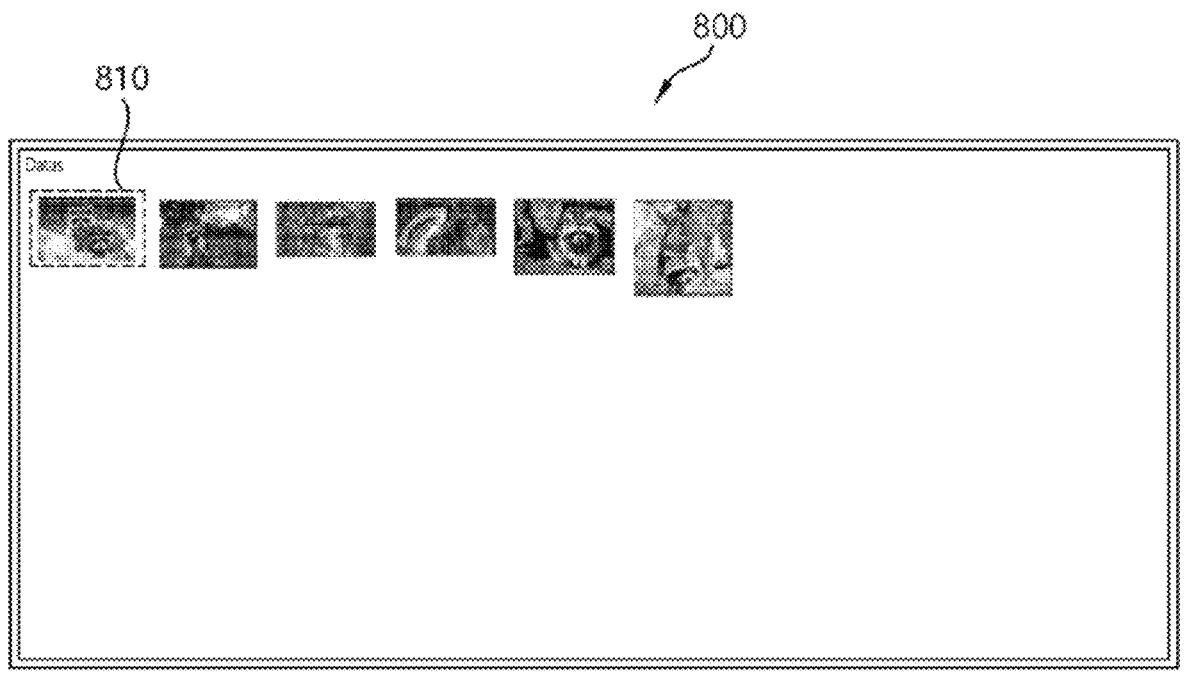
FIG. 10 is a diagram illustrating a processing target determination layer of a project execution area according to an embodiment of the present disclosure.

A method of determining content to be processed by the processor 120 according to an embodiment of the present disclosure will be described with reference to FIG. 10 below. FIG. 10 is a diagram illustrating a processing target determination layer of a project execution area according to an embodiment of the present disclosure.

The project execution area 500 may include a processing target determination layer 800 for receiving processing target content 810 to be processed using a learned project. The processor 120 may display the processing target determination layer 800 and receive the processing target content 810 which is input data of a trained model. The processor 120 may receive the processing target content 810 by dragging and dropping it in a folder storing multiple pieces of content. The convenience of a user interface may be increased when content to be processed is input by dragging and dropping it.

The processor 120 may receive the processing target content 810 in a form that is inputtable directly to a trained model. For example, in the case of image segmentation, the processor 120 may individually receive one or more images and input the one or more images to the trained model to perform an operation thereon. The above description of the processing target content is provided only as an example and the present disclosure is not limited thereto.

Alternatively, the processor 120 may receive the processing target content 810 in a form that cannot be input directly to the trained model. The processor 120 may adjust a size of an input image, for example, when the size of the input image is too large or small to be input to the model. Upon receiving, for example, a document in a Word file including a plurality of images to be processed using the model, the processor 120 may individually extract the plurality of images from the document and input the plurality of images to the model. The above description of the processing target content is provided only as an example and the present disclosure is not limited thereto.

Figure 11:
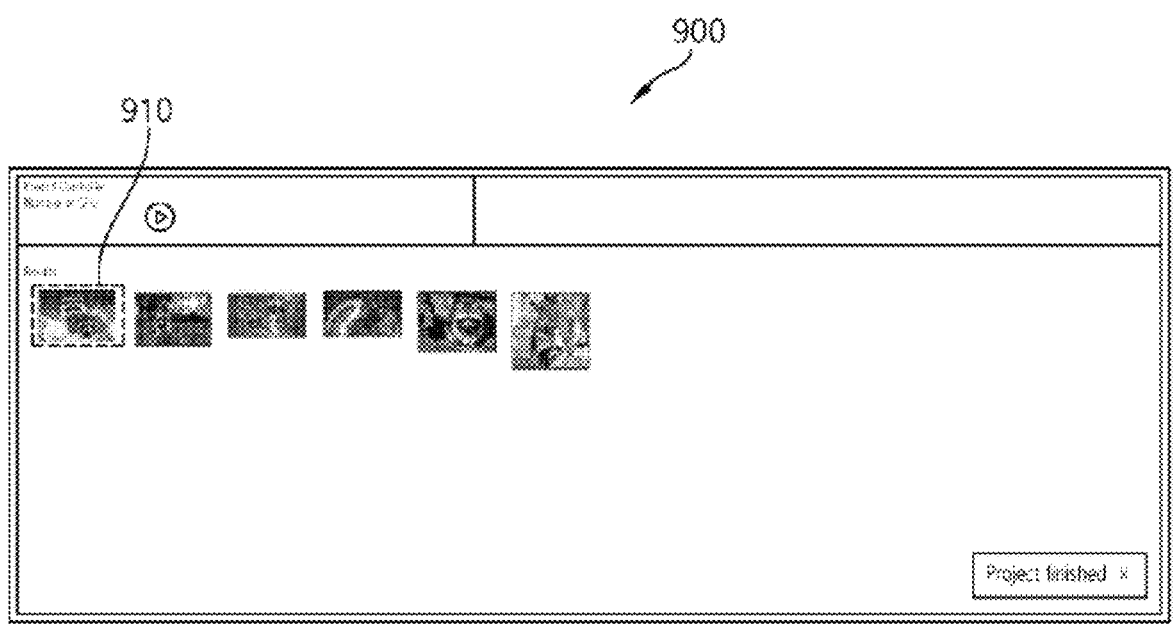
FIG. 11 is a diagram illustrating a content processing layer according to an embodiment of the present disclosure.
Figure 12:
FIG. 12 is a diagram illustrating a content processing result according to an embodiment of the present disclosure.
Figure 12:
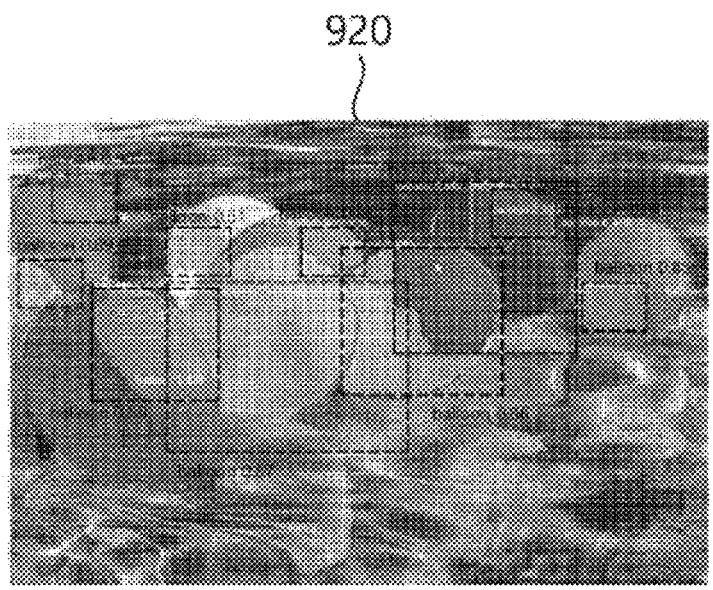

A method of processing content by the processor 120 according to an embodiment of the present disclosure will be described with reference to FIGS. 11 and 12 below. FIG. 11 is a diagram illustrating a content processing layer according to an embodiment of the present disclosure. FIG. 12 is a diagram illustrating a content processing result according to an embodiment of the present disclosure.

The project execution area 500 may include a content processing layer 900 for displaying a result 910 of processing content to be processed.

The content processing layer 900 may include an interface for displaying modified content when a content processing method is a method of modifying content. The processing 120 may display modified content on the content processing layer 900, and download at least some of the modified content determined on the basis of a selection input from a user and store the downloaded modified content in a different storage space. The above description of the content processing layer is provided only as an example and the present disclosure is not limited thereto.

The content processing layer 900 may include an interface for displaying content corresponding to a label for a selection input from a user among a plurality of labels when a content processing method is a method of classifying content or detecting an object.

When the content processing method is a method of classifying content, the processor 120 may display a result of classifying content corresponding to each of a plurality of classes on the content processing layer 900. The processor 120 may download content corresponding to at least some classes corresponding to a selection input from a user among a plurality of classes and store the downloaded content in a different storage space. For example, when multiple pieces of content may be classified into classes of a raccoon, a balloon, and an umbrella, the processor 120 may display the multiple pieces of content on the content processing layer 900 such that the multiple pieces of content classified into the raccoon, balloon, and umbrella classes are distinguished from one another. When a selection input for the balloon class among the raccoon class, the balloon class, and the umbrella class is received, the processor 120 may display only content classified as balloons separately or download the content and store it in a different storage space. The above description of the content processing layer is provided only as an example and the present disclosure is not limited thereto.

When a content processing method is a method of detecting an object, the processor 120 may display a result of detecting objects corresponding to a plurality of classes on the content processing layer 900. The processor 120 may display, for example, a result of detecting an object corresponding to each presence-of-object class or each absence-of-object class on the content processing layer 900. Alternatively, the processor 120 may display, for example, a result of detecting an object corresponding to a presence-of-first-object class, an absence-of-first-object class, a presence-of-second-object class, or an absence-of-second-object class on the content processing layer 900. The processor 120 may download content corresponding to at least some classes corresponding to a selection input from a user among a plurality of classes and store the downloaded content in a different storage space. For example, when classes corresponding to a result of detecting objects are a presence-of-raccoon class, an absence-of-raccoon class, a presence-of-balloon class, and an absence-of-balloon class, the processor 120 may display multiple pieces of content on the content processing layer 900 such that the multiple pieces of content may be distinguished from one another according to whether there are objects corresponding to a plurality of classes. When, for example, a selection input for a presence-of-raccoon class is received, the processor 120 may display content including only a raccoon and content including a raccoon and a balloon separately or may download the content including only a raccoon and the content including a raccoon and a balloon and store them in different storage spaces. According to an embodiment of the present disclosure, when there is content including a plurality of objects, the processor 120 may identify content including only a desired object and provide the content to a user. The above description of the content processing layer is provided only as an example and the present disclosure is not limited thereto.

The content processing layer 900 may include an interface for displaying only objects obtained by segmenting content when a content processing method is a method of segmenting content. For example, the processor 120 may divide a balloon, which is an object obtained by segmentation and included in a result 920 of processing content, from a background and display only the balloon on the content processing layer 900. The processor 120 may display an object, which is obtained by segmentation and divided from a background, on the content processing layer 900 separately from content or download the object and store it in a different storage space. By providing a user with the object obtained by segmentation and divided from the background, the object may be used, for example, by synthesizing the object with another background. The above description of the content processing layer is provided only as an example and the present disclosure is not limited thereto.

When a content processing method according to an embodiment of the present disclosure is used, even general users who do not fully understand a machine learning algorithm are able to select the content processing method, input content to a model to train the model, and process the content using the trained model. A content processing method according to an embodiment of the present disclosure may increase the convenience of processing content through a user's machine learning.

The configurations of the computing device 100 and the server 2000 shown in FIG. 1 are only simplified examples thereof. In an embodiment of the present disclosure, the computing device 100 and the server 2000 may include other components for execution of computing environments of the computing device 100 and the server 2000 or may be configured with only some of the components described herein.

The computing device 100 may include a network unit 110, a processor 120, and a memory 130. The server 2000 may include a network unit 2100, the processor 2200, and a memory 2300.

The network unit 110 and the network unit 2100 may transmit data providing a content processing method according to an embodiment of the present disclosure to or receive the data from other computing devices, a server or the like. The network unit 110 and the network unit 2100 may transmit data needed to implement embodiments of the present disclosure, such as content, a result of processing the content, etc., to and receive the data from other computing devices, a server, and the like. For example, the network unit 110 and the network unit 2100 may receive information, such as a project, a setting for the project, content to be processed, a result of processing the content, etc., from a database or the like. The network unit 110 and the network unit 2100 may enable communication between a plurality of computing devices to train the plurality of computing devices with a network function in a distributed manner. The network unit 110 and the network unit 2100 may enable communication between a plurality of computing devices to process an operation of outputting resultant content using the network function in a distributed manner.

The network unit 110 and the network unit 2100 according to an embodiment of the present disclosure may use various types of wired communication systems such as a public switched telephone network (PSTN), an x digital subscriber line (xDSL), a rate adaptive DSL (RADSL), a multi-rate DSL (MDSL), a very high-speed DSL (VDSL), a universal asymmetric DSL (UADSL), a high bit rate DSL (HDSL), a local area network (LAN), etc.

In the present specification, the network unit 110 and the network unit 2100 may use various types of wireless communication systems such as code division multi-access (CDMA), time division multi-access (TDMA), frequency division multi-access (FDMA), orthogonal frequency division multi-access (OFDMA), single carrier-FDMA (SC-FDMA), and other systems.

In the present disclosure, the network unit 110 and the network unit 2100 may be configured with any type of communication, such as wired communication or wireless communication, and configured as various types of communication networks such as a personal area network (PAN) and a wide area network (WAN). In addition, the network may be the well-known World Wide Web (WWW) or a wireless transmission technique used in short-range communication such as Infrared Data Association (IrDA) or Bluetooth may be employed.

The techniques described herein are applicable to not only the above-described networks but also other networks.

Each of the processor 120 and the processor 2200 may be configured with one or more cores and may include a processor, such as a central processing unit (CPU) of a computing device, a general-purpose graphical processing unit (GPGPU) or a tensor processing device (TPU), to process content and perform deep learning. The processor 120 and the processor 2200 may respectively read a computer program stored in the memory 130 and a computer program stored in the memory 2300, and provide a result of processing content according to an embodiment of the present disclosure. According to an embodiment of the present disclosure, the processor 120 may perform an operation of training a neural network. Each of the processor 120 and the processor 2200 may perform arithmetic operations, e.g., processing input data for training through deep learning (DN), extracting features from the input data, calculating a loss, or updating a weight of the neural network using backpropagate, to train the neural network. At least one of the CPU, the GPGPU, and the TPU of each of the processor 120 and the processor 2200 may process learning of a network function. For example, the CPU and GPGPU may provide operations for learning the network function and outputting a result of processing content using the network function together. In an embodiment of the present disclosure, processors of a plurality of computing devices may be used together to provide operations of learning the network function and outputting a result of processing content using the network function. A computer program performed in a computing device according to an embodiment of the present disclosure may be a program executable by the CPU, the GPGPU or the TPU.

According to an embodiment of the present disclosure, the processor 120 may transmit or receive data through the network unit 110. The processor 120 may transmit data to or receive data from another computing device or a server via the network unit 110.

According to an embodiment of the present disclosure, the processor 120 may include a plurality of threads or a plurality of cores included in the computing device 100. In the processor 120, operations may be performed by the plurality of threads or the plurality of cores in a distributed manner. Alternatively, in the processor 120, data may be transmitted or received between the plurality of threads or the plurality of cores. For example, an operation related to training a model may be performed by a first thread included in the processor 120, data related to the training of the model may be transmitted from the first thread to a second thread included in the processor 120, and an operation related to inference may be performed by the second thread. The operations described above are only examples and the present disclosure is not limited thereto, and desired operations according to the present disclosure may be performed by cores, threads, processors, computing devices, or servers in a distributed manner.

According to one embodiment of the present disclosure, the memory 130 and the memory 2300 store a form of information created or determined by the processor 120 and the processor 2200 and a form of information received by the network unit 110 and the network unit 2100.

According to an embodiment of the present disclosure, the memory 130 and the memory 2300 may include at least one type of storage medium among a flash memory type memory, a hard disk type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable ROM (PROM), a magnetic memory, a magnetic disk, and an optical disc. The computing device 100 may operate in connection with a web storage that performs a storage function of the memory 130 on the Internet. The memories described above are only examples and the present disclosure is not limited thereto.

A data structure may store data corresponding to a content processing algorithm according to an embodiment of the present disclosure.

An embodiment of the present disclosure provides a computer-readable medium storing a data structure.

The data structure may be understood to mean configuring, managing, and storing data to enables the data to be efficiently accessed and modified. The data structure may be a configuration of data for fixing a certain problem (e.g., to retrieve, store, and modify data within a shortest time). The data structure may be defined as a physical or logical relation between data elements, which is designed to support a particular data processing function. The logical relation between data elements may include a connection between the data elements that a user considers. The physical relation between the data elements may include an actual relation between the data elements physically stored in a computer-readable storage medium (e.g., a hard disk). Specifically, the data structure may include a set of data, a relation between the data, and a function or instructions applicable to the data. Through an effectively designed data structure, a computing device may perform operations while using minimum resources thereof. Specifically, the computing device may enhance the efficiency of arithmetic operations, reading, insertion, deletion, comparison, exchanging, and retrieving through the effectively designed data structure.

The data structure may be classified as a linear data structure or a non-linear data structure according to a form thereof. The linear data structure may be a structure in which only a piece of data is connected after a piece of data. The linear data structure may include a list, a stack, a queue, and a deque. The list may be a series of data sets to which priorities are assigned internally. The list may include a linked list. The linked list may be a data structure in which pieces of data are each given a pointer and are connected in a line. In the linked list, a pointer may include information about connection to a following or previous piece of data. The linked list may be referred to as a single linked list, a double-linked list, or a circular linked list according to a form thereof. The stack may be a data listing structure in which data is accessible in a restrictive manner. The stack may be a linear data structure in which data can be processed (e.g., inserted or deleted) only at an end of the linear data structure. The stack may be a last-in-first-out (LIFO) data structure in which data stored recently is output first. The queue is a data listing structure in which data is accessible in a restrictive manner and may be a first-in-first-out (FIFO) data structure in which data stored recently is output last unlike in the stack. The deck may be a data structure which can be processed at both ends.

The non-linear data structure may be a structure in which multiple pieces of data are connected after one piece of data. The non-linear data structure may include a graph data structure. The graph data structure may be defined by vertices and edges, and the trunk may include a line connecting two different vertices. The graph data structure may include a tree data structure. The tree data structure may be a data structure in which there is a path for connecting two different vertices among a plurality of vertices. That is, the tree data structure may be a data structure in which no loop is formed.

Throughout the present specification, an arithmetic operation model, a neural network, a network function, and a neural network (hereinafter referred to together as a neural network) may be referred to in the same sense. The data structure may include a neural network. The data structure, including the neural network, may be stored in a computer-readable medium. The data structure including the neural network may include data input to the neural network, a weight of the neural network, a hyper-parameter of the neural network, data obtained from the neural network, an activation function associated with each node or layer of the neural network, and a loss function for training the neural network. The data structure including the neural network may include some of the components described above. That is, the data structure including the neural network may include data input to the neural network, a weight of the neural network, a hyper-parameter of the neural network, data obtained from the neural network, an activation function associated with each node or layer of the neural network, a loss function for training the neural network, or a combination thereof. In addition to the above-described a components, the data structure including the neural networks may include any other information for determining characteristics of the neural network. In addition, the data structure may include various types of data used or generated in an arithmetic process of the neural network and is not limited to the above description. A computer-readable medium may include a computer-readable recording medium and/or a computer-readable transmission medium. The neural network may include a set of computational units that are generally referred to as nodes and are connected to one another. Such nodes may be referred to as neurons. The neural network includes at least one or more nodes.

The data structure may include data input to the neural network. The data structure including the data input to the neural network may be stored in a computer-readable medium. The data input to the neural network may include training data input during training of the neural network and/or input data input to the neural network after training. The data input to the neural network may include pre-processed data and/or data to be pre-processed. Pre-processing may include a process of processing data to be input to the neural network. Thus, the data structure may include data to be pre-processed and data obtained by pre-processing. The above-described data structure is only an example and the present disclosure is not limited thereto.

The data structure may include data input to or output from a neural network. The data structure including the data input to or output from the neural network may be stored in a computer-readable medium. The data structure stored in the computer-readable medium may include data input during an inference process of the neural network or data output as a result of the inference process of the neural network. Furthermore, the data structure may include data processed by a certain data processing method and thus may include processed and unprocessed data. Thus, the data structure may include data to be processed and data processed by a data processing method.

The data structure may include a weight of the neural network (the terms "weight" and "parameter" can be used in the same sense herein). The data structure including the weight of the neural network may be stored in a computer-readable medium. The neural network may include a plurality of weights. The weights are variable and may be changed by a user or an algorithm to perform a desired function of a neural network. For example, when each of one or more input nodes is connected to one output value through one link, a value of the output node may be determined based on values input to the input nodes connected to the output node and a parameter that is set for the link corresponding to each of the input nodes. The above-described data structure is only an example and the present disclosure is not limited thereto.

As a non-limiting example, the weights may include a weight that is variable during a training process of a neural network and/or a weight of the neural network after training. The weights that are variable in a training process of the neural network may include a weight when a training cycle starts and/or a weight that is variable during the training cycle. The weight when the training of the neural network is completed may include a weight when the training cycle is completed. Thus, a data structure including the weights of the neural network may include a data structure including the weight changed during the training process of the neural network and/or the weight when the training of the neural network is completed. Therefore, it should be understood that the weights described above and/or a combination of the weights are included in a data structure including the weights of the neural network. The above-described data structures are only an example and the present disclosure is not limited thereto.

The data structure including the weights of the neural network may be serialized and stored in a computer-readable storage medium (e.g., a memory or a hard disk). The serialization may be a process of converting the data structure into a form in which it may be stored in the same computing device or a different computing device, reconfigured and used at a later time. A computing device may serialize the data structure to transmit or receive data through a network. The serialized data structure including the weights of the neural network may be reconfigured in the same computing device or a different computing device through deserialization. The data structure including the weights of the neural network is not limited to serialization. Furthermore, the data structure including the weight of the neural network may include a data structure (e.g., a B-tree, Trie, an m-way search tree, an AVL tree, or a red-black tree of a non-linear data structure) for increasing the efficiency of an operation while using minimum resources of a computing device. The above description is provided only as an example and the present disclosure is not limited thereto.

The data structure may include a hyper-parameter of the neural network. The data structure including the hyper-parameter of the neural network may be stored in a computer-readable medium. The hyper-parameter may be a variable that is changeable by a user. Examples of the hyper-parameter may include a learning rate, a cost function, a number of times that a learning cycle is repeated, weight initialization (e.g., setting a range of weights that are weight initialization targets), and the number of hidden units (e.g., the number of hidden layers or the number of nodes of a hidden layer). The above-described data structure is only an example and the present disclosure is not limited thereto.

Figure 13:
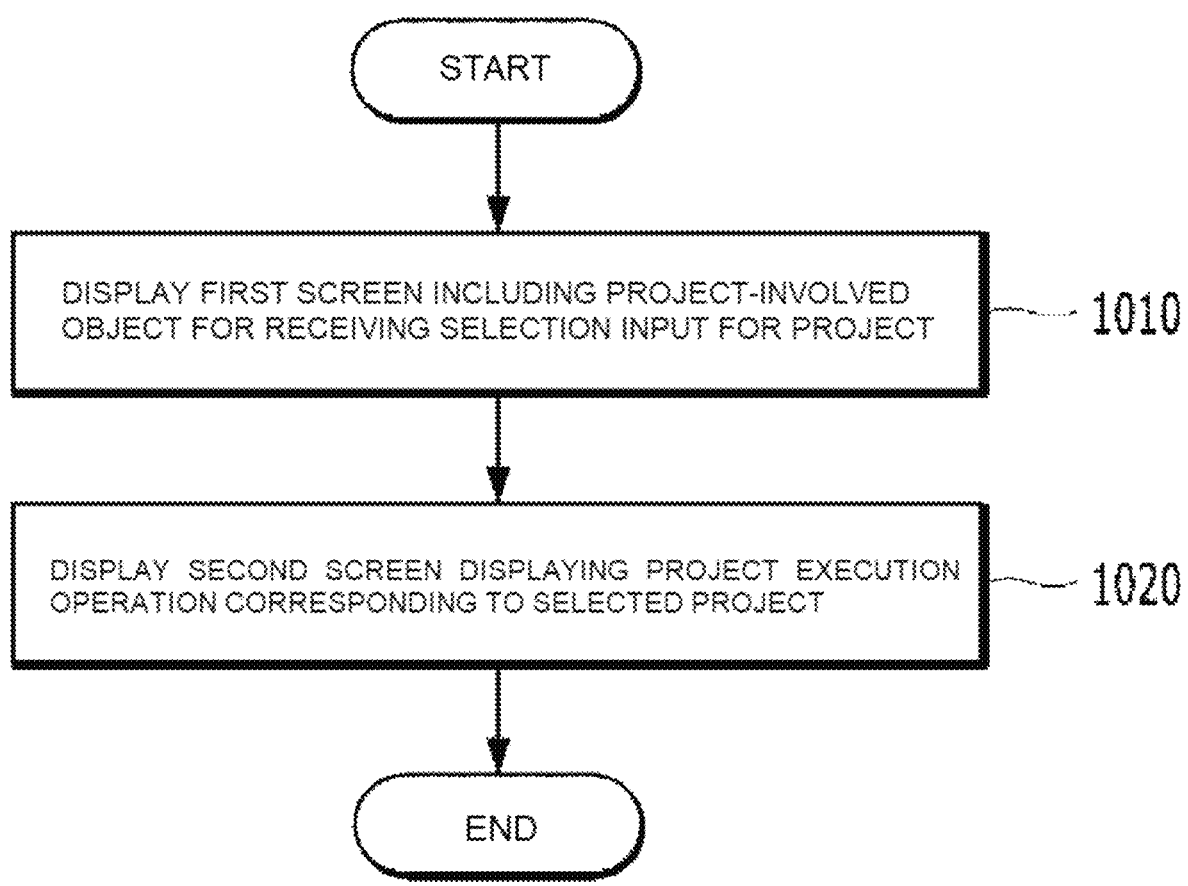
FIG. 13 is a flowchart of a content processing method according to an embodiment of the present disclosure.

FIG. 13 is a flowchart of a content processing method according to an embodiment of the present disclosure.

The computing device 100 may display a first screen including a project-involved object for receiving a selection input for a project (1010).

A project selection layer of the first screen may include a project selection object for receiving a selection input for execution of a previously created project and a project creation object for receiving a selection input for creation of a new project.

A project creation layer of the first screen may include two or more project-involved objects for creating a project in response to a selection input for the project creation object included in the project selection layer. The project-involved objects may be objects for receiving selection inputs for project configuration items. The two or more project-involved objects may include a domain selection object for configuring a domain of content, a processing method selection object for setting a content processing method, and a model selection object for configuring a content processing algorithm.

The computing device 100 may display a second screen displaying a project execution operation corresponding to a selected project (1020). The second screen may include a navigation area including an operation selection object for receiving a selection input for a project execution operation and a project execution area for processing content corresponding to the project execution operation.

The operation selection object included in the navigation area may include a training operation selection object for receiving a selection input for a training operation, and a content processing operation selection object for receiving a selection input for a content processing operation.

The project execution area may include a pre-processing layer for displaying a pre-processing operation for learning a project. The pre-processing layer may include at least one of a pre-processing configuration area for displaying an object related to a pre-processing configuration, a pre-processing content area for displaying a list of content to be pre-processed, or a pre-processing operation area for performing a pre-processing operation. The pre-processing content area may include two or more pre-processing target content objects each corresponding to one piece of content to be pre-processed. The computing device 100 may load content to be pre-processed, which corresponds to a pre-processing target content object, to the pre-processing operation area in response to a selection input for the pre-processing target content object. The pre-processing operation area may be an area for controlling pre-processing of content to be pre-processed on the basis of at least one of a pre-trained model or a user input. The pre-processing operation area may include at least one of a pre-processing operation interface for a preview of content to be modified when a content processing method is a method of modifying content, a pre-processing operation interface for assigning a classification label when the content processing method is a method of classifying content, a pre-processing operation interface for assigning an object identification label when the content processing method is a method of detecting an object, or a pre-processing operation interface for assigning a segmentation label when the content processing method is a method of segmenting content.

The project execution area may include a training layer for displaying a project learning operation. The training layer may include at least one of a training setting area for receiving a selection input for training settings or a training operation area for displaying a training operation. The training setting area may include at least one of a training setting object for receiving a user input for training settings or an object for displaying training progress information. The training operation area may be an area for displaying information about a degree of completion of training.

The project execution area may include a processing target determination layer for receiving content to be processed using a learned project. The project execution area may include a content processing layer for displaying a result for processing the content to be processed. The content processing layer may include at least one of an interface for displaying modified content when a content processing method is a method of modifying content, an interface for displaying content corresponding to a label for a selection input from a user among a plurality of labels when the content processing method is a method of classifying content or detecting an object, or an interface for displaying only an object obtained by segmenting content when the content processing method is a method of segmenting content.

Figure 14:
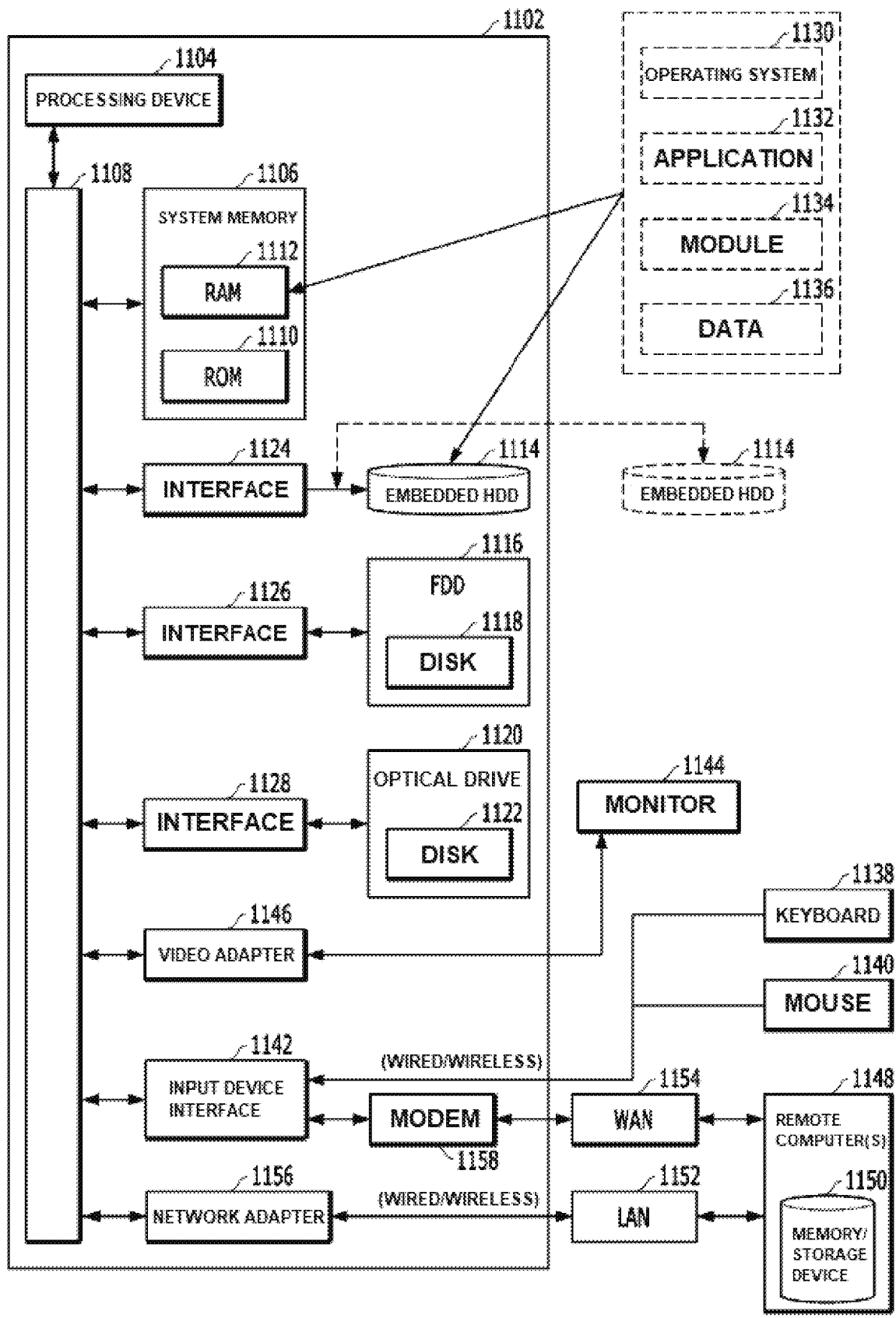
FIG. 14 is a block diagram of a computing device according to an embodiment of the present disclosure.

FIG. 14 is a black diagram of a computing device according to an embodiment of the present disclosure.

Although the present disclosure has been described above with respect to computer executable instructions executable generally by one or more computers, it will be understood by those of ordinary skill in the art that the present disclosure may be implemented in connection with other program modules and/or by a combination of hardware and software.

Generally, the program modules include a routine for performing a certain task or implementing a specific abstract data type, a program, a component, a data structure, etc. In addition, it will be understood by those of ordinary skill in the art that methods of the present disclosure may be implemented by other computer system configurations, including not only a single processor or multi-processor computer system, a mini-computer, and a main frame computer but also a personal computer, a hand-held computing device, micro-processor-based or programmable household appliances, etc. (each of which can be operated in connection with one or more devices associated therewith).

The embodiments of the present disclosure described above may be implemented in a distributed computing environment in which tasks are performed by remote processing devices connected through a communication network. In the distributed computing environment, program modules may be located in both a local memory storage device and a remote memory storage device.

Generally, the computer includes a variety of computer-readable media. Any medium accessible by a computer may be a computer-readable medium. Examples of the computer-readable medium include a volatile medium, a non-volatile medium, a transitory medium, a non-transitory medium, a removable medium, and a non-removable medium. In a non-restrictive example, the computer-readable medium may include a computer-readable storage medium and/or a computer-readable transmission medium. Examples of the computer-readable storage medium include a volatile medium, a non-volatile medium, a transitory medium, a non-transitory medium, a removable medium, and a non-removable medium implemented by a method or technology for storing information such as computer-readable instructions, data structures, program modules, and other types of data. Examples of the computer-readable storage medium include, but are not limited to, a RAM, a ROM, an EEPROM, a flash memory, other memory technology, a CD-ROM, a digital video disc (DVD), another optical disc storage device, a magnetic cassette, magnetic tape, a magnetic disk storage device, another magnetic storage device, and another type of media accessible by a computer and used to store desired information.

Generally, the computer-readable transmission medium includes various types of information transmission media for implementation of computer-readable instructions, data structures, program modules, or other types of data in a modulated data signal, such as a transport mechanism. The term "modulated data signal" refers to a signal in which one or more features are set or modified to encode information in the signal. In a non-restrictive example, the computer-readable transmission medium includes a wired medium such as a wired network or a direct-wire network and a wireless media such as sound, radio-frequency (RF) waves, infrared rays, and other types of wireless media. Any combination of the above-described media should be understood as falling within a range of computer-readable transmission media.

An example of an environment 1100 including a computer 1102 for implementation of various aspects of the present disclosure is illustrated in FIG. 14, and the computer 1102 includes a processing device 1104, a system memory 1106, and a system bus 1108. The system bus 1108 connects system components, including the system memory 1106 (embodiments are not limited thereto), to the processing device 1104. The processing device 1104 may be a processor among various types of commercial processors. A dual processor and other multi-processor architectures are available as the processing device 1104.

The system bus 1108 may be any of a memory bus, a peripheral device bus, and several types of bus structures additionally connectable to a local bus employing any of various types of commercial bus architectures. The system memory 1106 includes a read-only memory (ROM) 1110 and a random access memory (RAM) 1112. A basic input/output system (BIOS) is stored in a nonvolatile memory such as the ROM 1110, EPROM, or EEPROM, and includes a basic routine for helping transmit information between the components of the computer 1102, for example, during starting of the BIOS. The RAM 1112 may include a high-speed RAM such as a static RAM to cache data.

The computer 1102 may further include a hard disk drive (HDD) 1114 which is an inner type (e.g., EIDE or SATA) (which may be configured as an outer type in an appropriate chassis (not shown)), a magnetic floppy disk drive (1116) (designed to, for example, read data from or record data on a portable diskette 1118), and an optical disc drive 1120 (designed to, for example, read data from a CD-ROM disc 1122 or read data from or record data on another high-capacity optical medium such as a DVD). The HDD 1114, the FDD 1116, and the optical disc drive 1120 may be connected to the system bus 1108 via an HDD interface 1124, an FDD interface 1126, and an optical drive interface 1128, respectively. The HDD interface 1124 for implementation of an external drive includes at least one or both of Universal Serial Bus and IEEE 1394 interface technology.

These drives and computer-readable media associated therewith may store data, data structures, computer executable instructions, etc. in a non-volatile storing manner. In the case of the computer 1102, a certain type of data is stored in an appropriate digital format in drives and media. Although an HDD, a portable magnetic disk, a portable optical medium such as a CD or a DVD, etc. have been described as examples of a computer-readable medium, it will be understood by those of ordinary skill in the art that other types of computer-readable media such as a zip drive, a magnetic cassette, a flash memory card, a cartridge, etc. are also available in an operating environment and such media may store computer executable instructions for implementation of methods of the present disclosure.

A plurality of program modules, including the operating system 1130, one or more application programs 1132, other program modules 1134, and program data 1136, may be stored in a drive and the RAM 1112. All or part of an operating system, an application, a module, and/or data may be cached in the RAM 1112. It will be understood that the present disclosure can be implemented in commercially available operating systems or a combination of operating systems.

A user may input commands and information to the computer 1102 through one or more wired/wireless input device, e.g., a keyboard 1138 and a pointing device such as a mouse 1140. Other types of input devices (not shown) include a microphone, an infrared (IR) remote control, a joystick, a game pad, a stylus pen, a touch screen, etc. These components and the other types of input devices are generally connected to the processing device 1104 through the input device interface 1142 connected to the system bus 1108 but may be connected to the processing device 1104 through a parallel port, an IEEE 1394 serial port, a game port, a USB port, an IR interface, or other types of interfaces.

A monitor 1144 or other types of display devices are also connected to the system bus 1108 through an interface such as a video adapter 1146. In addition to the monitor 1144, a computer generally includes other peripheral output devices (not shown) such as a speaker, a printer, etc.

The computer 1102 may operate in a network environment by being logically connected to one or more remote computers such as a remote computer (remote computers) 1148 through wired communication and/or wireless communication. The remote computer(s) 1148 may include a workstation, a computing device computer, a router, a personal computer, a portable computer, a microprocessor-based game machine, a peer device, or other general network nodes, and generally, the computer 1102 includes some or all of the above-described components but only a memory/storage 1150 is shown here for brevity's sake. Logical connections illustrated in the drawings include wired/wireless connections to a LAN 1152 and/or a larger-scale network, e.g., a WAN 1154. LAN and WAN networking environments are common in offices and companies, facilitate an enterprise-wide computer network such as an intranet, and may be all connected to worldwide computer networks, e.g., the Internet.

When used in the LAN networking environment, the computer 1102 is connected to the LAN 1152 through a wired and/or wireless communication network interface or an adapter 1156. The adapter 1156 facilitates wired or wireless communication through the LAN 1152, and the LAN 1152 also includes a wireless access point to communicate with the wireless adapter 1156. When used in the WAN networking environment, the computer 1102 may include a modem 1158 or be connected to a communication computing device in the WAN 1154 or through the Internet, i.e., may include another unit for establishing communication through the WAN 1154. The modem 1158, which may be an embedded/external and wired/wireless device, is connected to the system bus 1108 through the serial port interface 1142. In a networked environment, the program modules described above with respect to the computer 1102 or some thereof may be stored in the memory/storage device 1150 which is a remote device. It will be appreciated that the illustrative network connection is only an example and another unit may be used to establish a communication link between computers.

The computer 1102 communicates with a wireless device or entity operated through wireless communication, e.g., a printer, a scanner, a desktop and/or portable computers, a portable data assistant (PDA), a telecommunications satellite, equipment or a place associated with a wirelessly detectable tag, telephone, etc. The wireless communication includes at least and Bluetooth wireless technology. Thus, the communication may be a predefined structure, e.g., an existing network, or may be simply ad hoc communication between at least two devices.

Wi-Fi (Wireless Fidelity) enables connections to the Internet or the like without wire. Wi-Fi is wireless technology such as cell phone technology allowing, for example, a computer to transmit and receive data indoors and outdoors, i.e., at any location within a range of communication in a base station. Wi-Fi networks employ IEEE 802.11(a, b, g, and others), which is wireless technology, to provide secure and reliable high-speed wireless connection. Wi-Fi may be used to connect computers to each other, the Internet, or a wired network (employing IEEE 802.3 or Ethernet). Wi-Fi networks may operate in an unlicensed radio band of 2.4 or 5 GHz, e.g., at a data rate of 11 Mbps (802.11a) or 54 Mbps (802.11b), or operate in products covering both 2.4 GHz and 5 GHz (dual band).

It will be understood by those of ordinary skill in the art of the present disclosure that information and signals can be represented using a variety of different technologies and techniques. For example, data, instructions, commands, signals, bits, symbols, and chips referred to in the above description may be represented by voltages, currents, electromagnetic waves, magnetic fields, particles, optical fields, or a combination thereof.

It will be understood by those of ordinary skill in the art that various types of logic blocks, modules, processors, means, circuits, and operations of algorithms described above as examples in relation to the embodiments set forth herein are implementable using electronic hardware, various types of programs or design codes (referred to as "software" herein for convenience of description), or a combination thereof. To clearly describe the interoperability between hardware and software, various types of components, blocks, modules, circuits, and operations have been generally described above as examples in relation to functions thereof. Whether such a function is implemented as hardware or software depends on a specific application and design restrictions imposed on the entire system. Functions described above in various ways with respect to each specific application can be implemented by those of ordinary skill in the art but decisions on the implementation should not be understood as not falling within the scope of the present disclosure.

The various embodiments set forth herein may be implemented as articles manufactured by methods, apparatuses, or standard programming and/or engineering techniques. The term "manufactured article" should be understood to include computer programs or media accessible by any computer-readable device. Examples of a computer-readable medium may include, but are not limited to, magnetic storage devices (e.g., a hard disk, a floppy disk, a magnetic strip, etc.), optical discs (e.g., a CD, a DVD, etc.), smart cards, and flash memory devices (e.g., an EEPROM, a card, a stick, a key drive, etc.). In addition, the various types of storage media presented herein include one or more devices for storing information and/or other mechanical-readable media.

It should be understood that a specific order or hierarchical structure of the operations of the processes introduced herein is only an examples of an access. It should be understood that a specific order of hierarchical structure of operations of a process within the scope of the present disclosure may be rearranged on the basis of design priorities. The appended method claims provide elements of various operations in a sample order but shop not be understood as being limited to the specific order or hierarchical structure presented therein.

The description of the embodiments set forth herein is provided to allow those of ordinary skill in the technical field to which the present disclosure pertains to use or implement the present disclosure. Various modifications to these embodiments will be apparent to those of ordinary skill in the technical field to which the present disclosure pertains. The general principles defined herein are applicable to other embodiments without departing from the scope of the present disclosure. Therefore, the present disclosure is not limited to the embodiments set forth herein and should be understood as falling within a widest range consistent with the principles and novel features presented herein.

The invention claimed is:

1. A computer program stored in a non-transitory computer-readable storage medium and causing operations of providing a content processing method to be performed when executed by one or more processors of a computing device, wherein the operations comprise:
    displaying a first screen including two or more project-involved objects for receiving a selection input to select a project, domain selection objects for configuring a domain of content, and one or more model selection objects, the domain including an image domain, a text domain and a speech domain, wherein the first screen comprises a project selection layer and a project creation layer, the project creation layer comprising the two or more project-involved objects for creating a project in response to a selection input for a project creation object included in the project selection layer, the two or more project-involved objects being objects for receiving a selection input for setting items for the project, the two or more project-involved objects including the domain selection objects, a processing method selection object for setting a content processing method and a model selection object for configuring a content processing algorithm, the model selection objects corresponding to one of You Only Look Once model, a Region based Convolutional Neural Network model, a fully convolutional network model, a semantic segmentation network model and a U network model and a MaskRCNN model; and displaying a second screen displaying a project execution operation corresponding to the selected project, wherein the second screen comprises a navigation area including an operation selection object for receiving a selection input for the project execution operation and a project execution area for processing content corresponding to the project execution operation.

2. The computer program of claim 1, wherein the project selection layer of the first screen comprises a project selection object for receiving a selection input for execution of a previously created project and a project creation object for receiving a selection input for creation of a new project.

3. The computer program of claim 1, wherein the operation selection object comprises a training operation selection object for receiving a selection input for a training operation and a content processing operation selection object for receiving a selection input for a content processing operation.

4. The computer program of claim 1, wherein the project execution area comprises a pre-processing layer for displaying a pre-processing operation for learning a project, wherein the pre-processing layer comprises at least one of a pre-processing configuration area for displaying an object related to a pre-processing configuration, a pre-processing content area for displaying a list of content to be pre-processed, or a pre-processing operation area for performing a pre-processing operation.

5. The computer program of claim 4, wherein the pre-processing content area comprises two or more pre-processing target content objects, and the computer program further comprises loading content to be pre-processed, which corresponds to one pre-processing target content object, in the pre-processing operation area in response to a selection input for the one pre-processing target content.

6. The computer program of claim 4, wherein the pre-processing operation area comprises an area for controlling pre-processing of content to be pre-processed on the basis of at least one of a pre-trained model or a user input.

7. The computer program of claim 4, wherein the pre-processing operation area comprises at least one of:
a pre-processing operation interface for a preview of content to be modified when a content processing method is a method of modifying content;
a pre-processing operation interface for assigning a classification label when the content processing method is a method of classifying content;
a pre-processing operation interface for assigning an object identification label when the content processing method is a method of detecting an object of content; or
a pre-processing operation interface for assigning a segmentation label when the content processing method is a method of segmenting content.

8. The computer program of claim 1, wherein the project execution area comprises a training layer for displaying a project learning operation, wherein the training layer comprises at least one of a training setting area for receiving a selection input for training settings or a training operation area for displaying a training operation.

9. The computer program of claim 8, wherein the training setting object comprises at least one of a training setting object for receiving a user input for training settings or an object for displaying training progress information.

10. The computer program of claim 8, wherein the training operation area comprises an area for displaying information about a degree of completion of training.

11. The computer program of claim 1, wherein the project execution area comprises a processing target determination layer for receiving content to be processed using a learned project.

12. The computer program of claim 1, wherein the project execution area comprises a content processing layer for displaying a result for processing content to be processed, wherein the content processing layer comprises at least one of:
an interface for displaying modified content when a content processing method is a method of modifying content;
an interface for displaying content corresponding to a label for a selection input from a user among a plurality of labels when the content processing method is a method of classifying content or detecting an object; or
an interface for displaying only an object obtained by segmenting content when the content processing method is a method of segmenting content.

13. A content processing method comprising:
displaying a first screen including two or more project-involved objects for receiving a selection input to select a project, domain selection objects for configuring a domain of content, and one or more model selection objects, the domain including an image domain, a text domain and a speech domain, wherein the first screen comprises a project, selection layer and a project creation layer, the project creation layer comprising the two or more project-involved objects for creating a project in response to a selection input for the project creation object included in the project selection layer, the two or more project-involved objects being objects for receiving a selection input for setting items for the project, the two or more project-involved objects including the domain selection objects, a processing method selection object for setting a content processing method and a model selection object for configuring a content processing algorithm, the model selection objects corresponding to one of You Only Look Once model, a Region based Convolutional Neural Network model, a fully convolutional network model, a semantic segmentation network model and a U network model and a MaskRCNN model; and displaying a second screen displaying a project execution operation corresponding to the selected project, wherein the second screen comprises a navigation area including an operation selection object for receiving a selection input for the project execution operation and a project execution area for processing content corresponding to the project execution operation.

14. A server for providing a content processing method, comprising:
a processor including one or more cores; and
a memory,
wherein the processor is configured to:

display a first screen including two or more project-involved objects for receiving a selection input to select a project, domain selection objects for configuring a domain of content, and one or more model selection objects, the domain including an image domain, a text domain and a speech domain, wherein the first screen comprises a project selection layer and a project creation layer, the project creation layer comprising the two or more project-involved objects for creating a project in response to a selection input for the project creation object included in the project selection layer, the two or more project-involved objects being objects for receiving a selection input for setting items for the project, the two or more project-involved objects including the domain selection objects, a processing method selection object for setting a content processing method and a model selection object for configuring a content processing algorithm, the model selection objects corresponding to one of You Only Look Once model a Region based Convolutional Neural Network model, a fully convolutional network model, a semantic segmentation network model and a U network model and a MaskRCNN model; and display a second screen displaying a project execution operation corresponding to the selected project, wherein the second screen comprises a navigation area including an operation selection object for receiving a selection input for the project execution operation and a project execution area for processing content corresponding to the project execution operation.

\* \* \* \* \*